(12) United States Patent
Porras et al.

(10) Patent No.: US 12,267,361 B2
(45) Date of Patent: Apr. 1, 2025

(54) CONVERSATION-DEPTH SOCIAL ENGINEERING ATTACK DETECTION USING ATTRIBUTES FROM AUTOMATED DIALOG ENGAGEMENT

(71) Applicant: SRI International, Menlo Park, CA (US)

(72) Inventors: Phillip Porras, Menlo Park, CA (US); Kenneth Nitz, Menlo Park, CA (US); Keith Skinner, Menlo Park, CA (US); Dayne Freitag, Menlo Park, CA (US)

(73) Assignee: SRI International, Menlo Park, CA (US)

( * ) Notice: Subject to any disclaimer, the term of this patent is extended or adjusted under 35 U.S.C. 154(b) by 220 days.

(21) Appl. No.: 18/059,496

(22) Filed: Nov. 29, 2022

(65) Prior Publication Data
US 2023/0179628 A1 Jun. 8, 2023

Related U.S. Application Data

(60) Provisional application No. 63/265,148, filed on Dec. 8, 2021.

(51) Int. Cl.
*H04L 9/40* (2022.01)
*G06F 40/30* (2020.01)
*G06F 40/35* (2020.01)

(52) U.S. Cl.
CPC .......... *H04L 63/1483* (2013.01); *G06F 40/30* (2020.01); *G06F 40/35* (2020.01)

(58) Field of Classification Search
None
See application file for complete search history.

(56) References Cited

U.S. PATENT DOCUMENTS 11,102,244 B1 * 8/2021 Jakobsson ............... H04L 51/42
11,494,486 B1 * 11/2022 Kim ....................... G06N 3/045

OTHER PUBLICATIONS

Dalton et al. ("The Panacea Threat Intelligence and Active Defense Platform." arXiv:2004.09662 [cs.CL]. https://doi.org/10.48550/arXiv.2004.09662. Submitted Apr. 20, 2020. 8 pages). (Year: 2020).*

* cited by examiner

*Primary Examiner* — Jeffrey R Swearingen
(74) *Attorney, Agent, or Firm* — McDonnell Boehnen Hulbert & Berghoff LLP

(57) ABSTRACT

A method of determining an adversarial attack playbook includes receiving, from an adversarial actor, an electronic communication intended for a target user. The method includes engaging in a deep dialog with the adversarial actor by deploying a synthetic persona dynamically during the electronic communication. The deep dialog includes multiple rounds of communication exchanges. The method includes determining a length and type of the deep dialog to obtain attributes related to the adversarial actor. The method includes identifying a conversational pattern from the deep dialog. The conversational pattern comprises dialog interaction elements utilized by the adversarial actor. The method includes dynamically producing, based on the conversational pattern, the playbook associated with the adversarial actor. The playbook is indicative of a dialog interaction strategy implemented by the adversarial actor. The method includes providing the playbook to a social engineering attack (SEA) system in order to detect, avoid and/or mitigate future attacks.

21 Claims, 16 Drawing Sheets

200A

| | Column1 | Column2 | Column3 | Column4 | Column5 | Column6 | Column7 | Column8 | Column9 | Column10 |
|---|---|---|---|---|---|---|---|---|---|---|
| | ID | Duration | Total No. of Msgs | No. of Incoming Msgs | Indicators | Smart Responses | Extracted Information | Device Fingerprints | IP Address; Geolocation | Sender |
| R1 | TP2541 | 10-30; 23:44 | 8 emails | 1 email | 4255 attribute lines flags | 7 emails | Foundation Name Claims Verified | B8D5XXX2 | 94.77.091.3 33; non-proxied, ISP, Country A | foundation@domain1.org |
| R2 | TP713 | 09-08; 10:34 | 5 texts, 2 emails | 2 texts | 4087 attribute lines flags | 3 texts, 2 emails | Weight Loss Program | 7CZJ8867 | 91.65.354.9 89; non-proxied, ISP/Mobile, Country B; 125.454.37.98; non-proxied, ISP, Country C | weight_loss@domain2.com |
| R3 | TP445 | 08-25; 07:18 to 09-07; 06:12 | 35 emails | 11 emails | 3875 attribute lines flags | 24 emails | Attn Jane Doe 6 Undeliverable Emails | B8D5XXX2 | 94.77.091.3 33; non-proxied, ISP, Country A | john.doe@domain.com |

FIG. 2A

```
Reporting Service flag data for CID-abcdefg9999-999x-1234-ab1c-12de3fg45h67:        200B
        received message list:
                <202109021132.196BTxTH001002@newhost.hostname.cc>
205             <CAL8-vvvv999999bbcvxHGF567DRT@mail.mailco.com>
                <CAL8-vvkk976999bbljxHKF487D876@mail.mailco.com>
        sent message list:
                MOUT-ab123456-7c8e-91e2-f011-99ee1b9cacc3
210             MOUT-ab123uu6-7c8e-91e2-f011-99ee1b9cacc3
                MOUT-ab1sd456-7c8e-91e2-f011-99ee1b9cacc3
                MOUT-ab123996-7c8e-91e2-f011-99ee1b9cacc3
                MOUT-wh12346-7c8e-91e2-f011-99ee1b9cacc32
                MOUT-db128416-7c8e-91e2-f011-99ee1b9cacc3
                MOUT-xo150356-7c8e-91e2-f011-99ee1b9cagd9
                MOUT-ab513458-7c8e-91e2-f011-99ee1b9cacl71
                MOUT-nnab1403-7c8e-91e2-f011-99ee1b9cakh4
demographics
        languages                       = English                       215
personal_info
        first_name                      = John
        last_name                       = Doe
        middle_name                     = A.
Income
        currency                        = $500,000.00
income
        currency                        = 500,000.00 dollars
demographics
        gender                          = male
occupation
        company                         = Z National Development Bank
occupation
        company                         = here in city Z
occupation
        company                         = United States dollars
email_client
        email_address_business          = jane.doe@mailco.com
email_client
        email_address_business          = jane.doe@mailco.com
>
>
email_client
        email_address_business          = phone?TTFN, <jane.doe@mailco.com>
email_client
        email_address_business          = jane.doe@mailco.com
personal_info
        first_name                      = Jill
        last_name                       = jill.doe@mailco.com
personal_info
        first_name                      = Jill
location
        state                           = ID
```

FIG. 2B

CONVERSATION-DEPTH SOCIAL ENGINEERING ATTACK DETECTION USING ATTRIBUTES FROM AUTOMATED DIALOG ENGAGEMENT

CROSS-REFERENCE TO RELATED APPLICATIONS

This application claims priority to U.S. Provisional Patent Application No. 63/265,148, filed on Dec. 8, 2021, which is hereby incorporated by reference in its entirety.

GOVERNMENT LICENSE RIGHTS

This invention was made with the Government support under contract no. FA8650-18-C-7880 awarded by Air Force Research Laboratory. The Government has certain rights in this invention.

BACKGROUND

Electronic communications are a core component in a variety of daily tasks, both personal and professional. Electronic communication can be performed over different modes, such as electronic mails, instant messages, telephonic messages, and so forth. Several platforms and services are available to enable electronic communications. As such communications become ubiquitous, so do communications from potentially hostile agents that attempt to extract information, such as protected information related to personal, medical, financial, and other data. Some attacks may be directed to security networks to extract information from secured systems associated with an organization.

SUMMARY

In a first aspect, a computer-implemented method for determining an adversarial attack playbook associated with an adversarial actor is provided. The method includes receiving, by a computing device, an electronic communication from the adversarial actor, wherein the electronic communication is intended for a target user. The method also includes engaging in a deep dialog with the adversarial actor by deploying a synthetic persona dynamically during the electronic communication intended for the target user, wherein the deep dialog comprises two or more rounds of electronic communication exchanges between the adversarial actor and the synthetic persona. The method additionally includes determining a length and type of the deep dialog in order to obtain one or more attributes related to the adversarial actor. The method also includes identifying, based on the one or more attributes, a conversational pattern from the deep dialog, wherein the conversational pattern comprises one or more dialog interaction elements utilized by the adversarial actor during the deep dialog. The method also includes dynamically producing, based on the identified conversational pattern, the playbook associated with the adversarial actor automatically, wherein the playbook is indicative of a dialog interaction strategy implemented by the adversarial actor. The method also includes providing, by the computing device, the playbook to a social engineering attack (SEA) system in order to detect, avoid and/or mitigate future attacks.

In a second aspect, a system for determining an adversarial attack playbook associated with an adversarial actor is provided. The system includes a dialog manager configured to engage in a deep dialog with the adversarial actor, a counterphish elicitation system configured to extract data from the deep dialog, one or more processors, and data storage. The data storage has stored thereon computer-executable instructions that, when executed by the one or more processors, cause a computing device to perform operations. The operations include receiving an electronic communication from the adversarial actor, wherein the electronic communication is intended for a target user. The operations also include engaging, by the dialog manager, in a deep dialog with the adversarial actor by deploying a synthetic persona dynamically during the electronic communication intended for the target user, wherein the deep dialog comprises two or more rounds of electronic communication exchanges between the adversarial actor and the synthetic persona. The operations additionally include determining, by the dialog manager, a length and type of the deep dialog in order to obtain one or more attributes related to the adversarial actor. The operations also include identifying, by the counterphish elicitation system and based on the one or more attributes, a conversational pattern from the deep dialog, wherein the conversational pattern comprises one or more dialog interaction elements utilized by the adversarial actor during the deep dialog. The operations further include dynamically producing, based on the identified conversational pattern, the playbook associated with the adversarial actor automatically, wherein the playbook is indicative of a dialog interaction strategy implemented by the adversarial actor. The operations also include providing the playbook to a social engineering attack (SEA) system in order to detect, avoid and/or mitigate future attacks.

In a third aspect, a computing device for determining an adversarial attack playbook associated with an adversarial actor is provided. The computing device includes one or more processors and data storage. The data storage has stored thereon computer-executable instructions that, when executed by the one or more processors, cause the computing device to perform operations. The operations include receiving an electronic communication from the adversarial actor, wherein the electronic communication is intended for a target user. The operations also include engaging in a deep dialog with the adversarial actor by deploying a synthetic persona dynamically during the electronic communication intended for the target user, wherein the deep dialog comprises two or more rounds of electronic communication exchanges between the adversarial actor and the synthetic persona. The operations additionally include determining a length and type of the deep dialog in order to obtain one or more attributes related to the adversarial actor. The operations also include identifying, based on the one or more attributes, a conversational pattern from the deep dialog, wherein the conversational pattern comprises one or more dialog interaction elements utilized by the adversarial actor during the deep dialog. The operations further include dynamically producing, based on the identified conversational pattern, the playbook associated with the adversarial actor automatically, wherein the playbook is indicative of a dialog interaction strategy implemented by the adversarial actor. The operations also include providing the playbook to a social engineering attack (SEA) system in order to detect, avoid and/or mitigate future attacks.

In a fourth aspect, an article of manufacture is provided. The article of manufacture includes a non-transitory computer-readable medium having stored thereon program instructions that, upon execution by one or more processors of a computing device, cause the computing device to carry out operations. The operations include receiving an electronic communication from the adversarial actor, wherein the electronic communication is intended for a target user. The operations also include engaging in a deep dialog with the adversarial actor by deploying a synthetic persona dynamically during the electronic communication intended for the target user, wherein the deep dialog comprises two or more rounds of electronic communication exchanges between the adversarial actor and the synthetic persona. The operations additionally include determining a length and type of the deep dialog in order to obtain one or more attributes related to the adversarial actor. The operations also include identifying, based on the one or more attributes, a conversational pattern from the deep dialog, wherein the conversational pattern comprises one or more dialog interaction elements utilized by the adversarial actor during the deep dialog. The operations further include dynamically producing, based on the identified conversational pattern, the playbook associated with the adversarial actor automatically, wherein the playbook is indicative of a dialog interaction strategy implemented by the adversarial actor. The operations also include providing the playbook to a social engineering attack (SEA) system in order to detect, avoid and/or mitigate future attacks.

BRIEF DESCRIPTION OF THE FIGURES

FIG. 2A depicts an example dialog manager, in accordance with example embodiments.

FIG. 2B depicts another example dialog manager, in accordance with example embodiments.

DETAILED DESCRIPTION

Figure 1A:
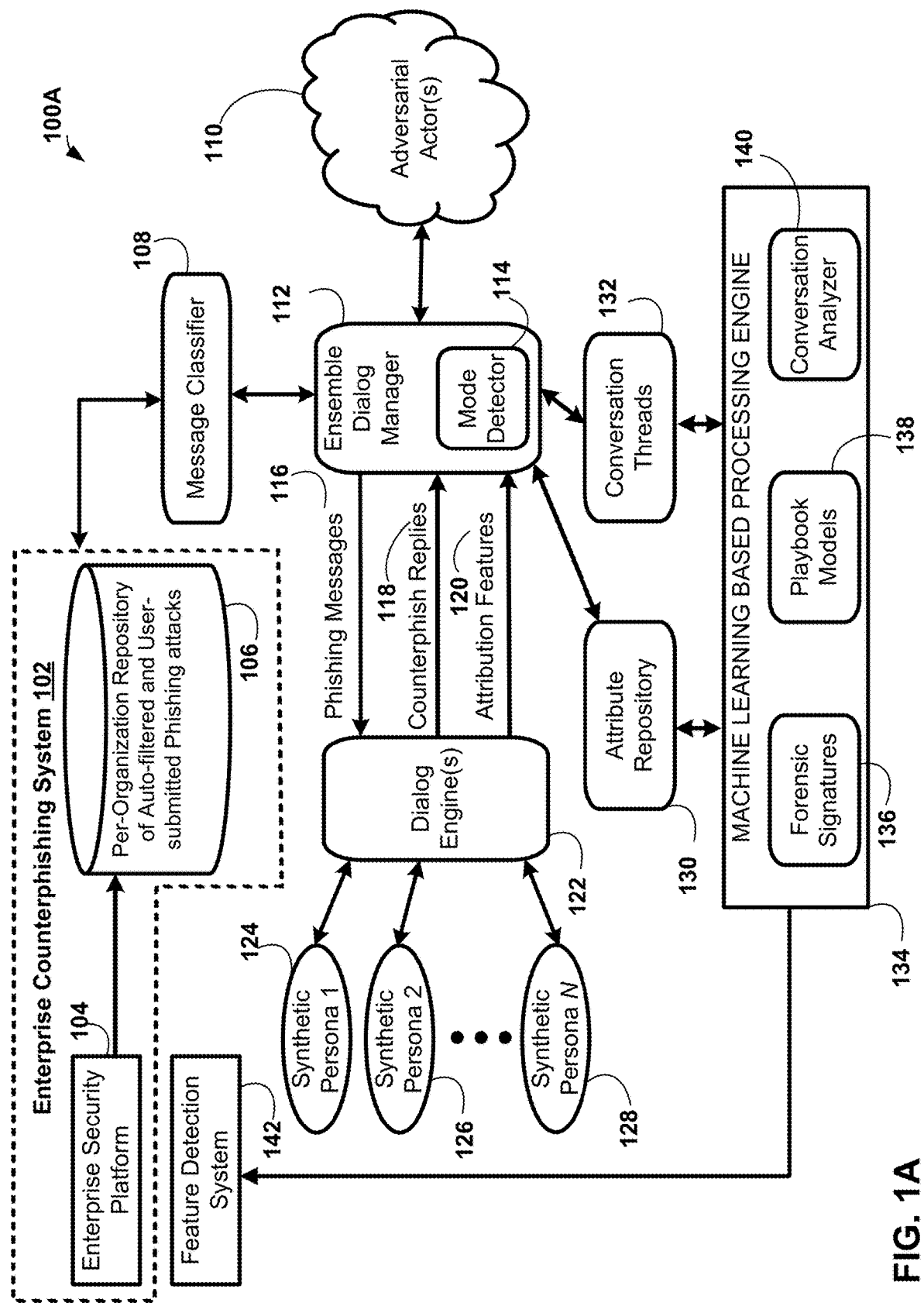
FIG. 1A depicts an example architecture for a social engineering attack detection system, in accordance with example embodiments.

Social engineering attacks (SEA) can range from large-scale advanced phishing attacks to high-precision spear-phishing incidents. Malicious social engineering can refer to a manipulation of an individual, psychological or otherwise, to cause the individual to divulge information that may harm the individual. SEAs can take many forms, including but not limited to, phishing, spear phishing, smishing, vishing, baiting, and so forth.

Social engineering attack prevention systems use techniques that are typically anti-spam derivative technologies to identify and block the initial phishing message. These methods may involve the use of heuristics, forensic validation, reputation analysis, and/or language classification models, to filter messages exhibiting spam and phishing indicators that rise above a given threshold. Current state of the art (SOTA) technologies are successful to the extent that very high percentages of spam and phishing attacks can be blocked by these products. Unfortunately, very small fractional percentages of phishing attacks can result in highly significant loss from the subsequent social engineering attacks. Furthermore, adversaries may employ spearphishing attacks, which are customized and performed at smaller scales, and which are designed and pre-validated to exclude as many phishing indicators as possible, and as a result bypass these SEA prevention technologies at much higher rates.

One underlying weakness in modern social engineering attack prevention systems is that they perform well against an initial attack message, but once an attack bypasses the prevention system and a target is engaged, these conventional products are largely ineffective in detecting subsequent attack indicators or in recognizing common playbooks used by a live phisher to attack their target. For example, sophisticated attackers may remove indicators of phishing, and make an initial message appear to be a legitimate message requesting information, to entice a target (e.g., individual, organization, and company, group) to engage in a SEA conversation. Existing systems are not equipped to detect such conversations, or identify such masked initial messages. The weaknesses of such systems may be attributed to their lack of knowledge integration related to forensic attributes of an adversary, and/or playbook dialog patterns that adversaries employ once the target is engaged in the social engineer attack conversation. Counter-phishing systems generally focus on classification of the initial SPAM and phishing messages. In some instances, counter-phish bot systems may be deployed. For example, counter-phish bot systems may focus on increasing the adversary work factor of phishing scammers by inundating them with plausible synthetic messages, such that actual engagements with human targets becomes cost prohibitive.

Based on widespread email experiences, it is generally recognized that regular streams of phishing attacks that bypass email and social media based message protection systems have become very common. These attacks may range from generic attacks to sophisticated phishing attacks that may be thwarted when message recipients are trained to be on guard and suspicious of both solicited and unsolicited messages. The system described herein provides a novel method for enhancing the state of social engineering attack defense. Counterphishing systems capable of employing SEA Conversation-Depth Modeling in adversarial message identification are described. Unlike existing systems, the machine learning based techniques described herein use a conversation-depth counter-phishing system to perform counter-phish engagements in order to collect latent attributes and to mine breadth of adversarial engagement patterns to identify adversaries that bypass SOTA filtering systems.

SOTA counterphishing technologies are extended with threat intelligence, heuristics, and advance NL/ML classification services that can detect the entire SEA conversation and meta-conversation playbooks, in addition to the introductory messages. This may be implemented as a harvesting service to perform conversation collection at scale, using an advanced counterphishing dialog engine, and an ensemble dialog manager.

The system described herein may be trained through active engagement with adversaries, and can be configured to deliver new heuristics and detection models at regular intervals. These models may then be used proactively, to scan new incoming messages, and retrospectively, to mine message inboxes for prior SEA conversations that were missed by the counterphishing protection mechanisms. As described herein, a scalable framework is described that engages social engineering attackers in conversations. The system enables a scalable collection of latent forensic indicators and dialog patterns that an adversary is likely to reveal once a target is engaged in a SEA conversation. The system may perform an in-depth SEA conversation analysis, extract patterns from past and present SEA conversations, and use the information to detect past SEA conversations that may have gone undetected, anticipate and/or prevent future SEA conversations, and also identify an ongoing SEA conversation, notify the target, and so forth.

Accordingly, methods and systems are disclosed that may receive a plurality of incoming messages from one or more hostile actors. The system may analyze the messages and intelligently engage with the one or more hostile actors to extract attributes that provide information about the one or more hostile actors. In some aspects, a playbook may be generated for each of the one or more hostile actors. The system may employ various machine learning models to classify the plurality of incoming messages based on existing playbooks, and perform natural language processing on the plurality of incoming messages to identify intent, and to generate appropriate responses.

Example Architecture

FIG. 1A depicts an example architecture for a social engineering attack detection system 100A, in accordance with example embodiments. As illustrated in FIG. 1A, an enterprise counterphishing system 102 may include an enterprise security platform 104. Enterprise security platform 104 may be configured to automatically identify and isolate incoming electronic communications for enterprise users, such as employees at a company. Some embodiments involve receiving, by a computing device, an electronic communication from the adversarial actor, wherein the electronic communication is intended for a target user. For example, enterprise counterphishing system 102 may include a message scraper, a message classifier, a notification generator, and so forth. A repository 106 of auto-filtered and/or user-submitted phishing or spear phishing attack communications may be maintained by enterprise counterphishing system 102. For example, enterprise security platform 104 may identify candidate SEA introduction emails through heuristics and machine learning (ML) classification of anti-spam filtered phishing emails or through direct user submission of phishing attacks.

User-submitted emails may be of particular interest because they can represent more advanced attacks that are customized for the target user, and may not be proliferated at scales that are easily detectable by SOTA technologies. For example, a user may be able to detect that a particular message is not from a purportedly known person, such as a friend, a relative, a colleague, and so forth. Accordingly, such messages may be labeled to train machine learning models, and/or update existing ML models. User-submitted messages may include indicators such as users that are targeted, adversaries that target such users, reveal playbook strategies for such adversarial actors, as well as SEA strategies that may be successful, or not successful. In some implementations, repository 106 may be a per-organization repository. For example, different companies may have different repositories.

Message classifier 108 may be in communication with one or more of such repositories, and may collect the messages from them (e.g., from repository 106). In some aspects, message classifier 108 may be an ML-based candidate message classifier. For example, message classifier 108 may use heuristics, ML thematic labels, and/or ML text classification, to identify phishing attacks with live email addresses seeking a response from a target. In some embodiments, message classifier 108 may monitor message inboxes, monitor phishing attacks, and send to repository 106 for storage. In some embodiments, message classifier 108 may identify indicators of a phishing attack.

In some embodiments, a message may be intercepted during a phishing attack. For example, message classifier 108 may identify a message as a phishing attack, and submit the message to the ensemble dialog manager (EDM) 112. Also, for example, an adversarial actor may have already engaged a target user in a conversation dialog that includes an exchange of messages. Accordingly, message classifier 108 may identify the conversation as an ongoing phishing attack, and submit the messages in the conversation to EDM 112.

Message classifier 108 may submit such and other messages (e.g., those identified by a user, messages in a repository, and so forth) to EDM 112. Some embodiments involve engaging in a deep dialog with the adversarial actor (or attacker or hostile actor) by deploying a synthetic persona dynamically during the electronic communication intended for the target user, wherein the deep dialog comprises two or more rounds of electronic communication exchanges between the adversarial actor and the synthetic persona. The term "synthetic persona" as used herein generally refers to a synthetic user profile. In some aspects, the term "synthetic persona" may also refer to a synthetic bot associated with the synthetic user profile. The term "deep dialog" generally refers to multiple rounds of electronic communication exchanges, such as messages exchanged between the adversarial actor and the synthetic persona. As described herein, each round may be designed to elicit one or more attributes of the adversarial actor, extract one or more forensic signatures of the adversarial actor, reveal a conversational pattern of the adversarial actor, and so forth.

For example, EDM 112 may orchestrate each independent conversation thread between an attacker and a selected dialog engine. EDM 112 may take the candidate messages and send them to one or more dialog engines 122 that engage the adversary (e.g., by pretending to take a bait). For example, EDM 112 may deploy the one or more dialog engines 122 to pivot the conversation to a SEA conversation with a synthetic persona. EDM 112 can use multiple strategies to manage ongoing dialog threads with adversaries, and can integrate termination logic to halt threads that become non-active, and/or that have exceeded a maximum conversation length. In some embodiments, EDM 112 may include a mode detector 114 that detects a mode or a channel of the incoming phishing messages. For example, mode detector 114 can identify if a phishing message is an electronic mail, an instant message, a social interaction platform, etc. In some embodiments, mode detector 114 can identify a social interaction platform or software application that is a channel for the phishing message. In some embodiments, mode detector 114 can identify a language for the phishing message.

In some embodiments, EDM 112 may deploy a hybrid model that includes pivoting between different channels, languages, social media platforms, and so forth, to engage the adversarial actor. Such a multi-channel strategy may include switching from an email to a post on a social networking platform, to an instant message, as some examples. Generally, any form of social media interaction, and/or any channel used for an SEA may be used for response and/or engagement strategies.

In some embodiments, EDM 112 may be configured to operate as a repository manager that collects attribute features 120 that are reported by one or more dialog engines 122. The social engineering attack detection system 100A described herein can integrate a range of dialog engines 122, each with unique strategies for engaging in counterphishing conversations, and each initiating these conversations with the adversaries using different synthetic user personas, such as, for example, synthetic persona 1 124, synthetic persona 2 126, and synthetic persona N 128. For example, one or more phishing messages 116 may be provided to dialog engines 122, and counterphish responses 118 may be generated by the synthetic persona.

In some embodiments, the engaging in the deep dialog with the adversarial actor is performed by a dialog model, and the method involves determining a rate of engagement associated with the dialog model, wherein the rate of engagement is indicative of a success rate of the dialog model in the engaging in the deep dialog with the adversarial actor. For example, a rate of engagement (RoE) may be determined for each of the deployed dialog models. The rate of engagement indicates a success rate at which an adversarial actor responds to a reply message sent by the deployed dialog model, and/or is enticed to open an attribution resource (i.e., an attribution web-link). For example, 136 engagements from 987 counterphish initiations results in a rate of engagement of 13.78%. As another example, 170 engagements from 1426 counterphish initiations results in a rate of engagement of 11.92%.

In some embodiments, a per thread RoE may be determined for each conversation thread (or deep dialog). For example, 1096 engagements from 3047 threads results in a per thread RoE of 0.359 or 35.9%. Also, for example, an RoE for each threat actor may be determined. This indicates, for example, a number of unique email addresses that all the synthetic personas engaged with. For example, 397 engagements (across all synthetic personas) from 807 unique threat actors (e.g., unique email addresses) results in a threat actor RoE of 0.492 or 49.2%.

In some embodiments, the different RoEs may be used to determine a counterphish strategy. For example, a future deployment of the dialog model may be based on the rate of engagement. For example, a high threat actor RoE may result in a strategy where multiple dialog models are deployed together. Also, for example, a low per thread RoE may indicate that a different conversation thread be used. As another example, dialog models may be deployed based on their individual RoEs. In some embodiments, an individual RoE may change from one adversarial actor to another. For example a first dialog model may have a high individual RoE in engaging with a first adversarial actor, and may have a low individual RoE in engaging with a second adversarial actor. Also, a second dialog model may have a low individual RoE in engaging with the first adversarial actor, and may have a high individual RoE in engaging with the second adversarial actor. Accordingly, the first dialog model may be deployed to engage with the first adversarial actor, and the second dialog model may be deployed to engage with the second adversarial actor. Other combinations and/or permutations are possible.

The social engineering attack detection system 100A may be configured to filter messages based on various filters. For example, one or more thresholds may be used to trigger when a message is delivered to EDM 112. In some embodiments, message classifier 108 may filter out messages from senders that SEA detection system 100A may not wish to engage with, such as, for example, legitimate senders, government agencies, email lists, training messages, and so forth. In some embodiments, message classifier 108 may identify indicators that an engagement may be useful to understand messages thematically, and/or classify them with thematic labels, as a coin fraud, a tax fraud, and so forth, by utilizing keyword and/or key phrase indicators. In some embodiments, message classifier 108 may identify indicators of a live email address. In some embodiments, message classifier 108 may identify indicators of another contact email address. Accordingly, message classifier 108 may harvest multiple email addresses to determine individuals, and/or organizations that may be contacted in a counterphishing conversation. Indicators may include contact information, phrases, indicators of a scheme, and so forth. For example, a message such as "I'll give you my lottery winnings; you send me your bank account" may indicate a willingness to engage, and such intentions may be detected by SEA detection system 100A. In some embodiments, message classifier 108 may classify messages based on such indicators (e.g., used as labels in supervised training of machine learning models).

In some embodiments, message classifier 108 may use "fuzzy" learning to identify a message or a SEA conversation as malicious. For example, an individual may review messages that are filtered and not sent to EDM 112. The individual may review such messages and determine if they should have been identified as candidate messages for further analysis by EDM 112. For example, a message may be designed to appear legitimate, but an expert may detect attributes that identify it to be a spam message. Accordingly, the individual may identify additional attributes that are used in such human decision-making, and an ML classifier may be updated with additional labels, features, and so forth. Also, for example, one or more machine learning strategies, such as, for example, online learning, reinforcement learning techniques, and so forth, may be applied. For example, in reinforcement learning techniques, the ML model is rewarded for correctly identified candidate messages, and/or penalized for incorrectly identified candidate messages.

The social engineering attack detection system 100A described herein can use several deployment strategies. In some embodiments, the engaging in the deep dialog with the adversarial actor involves utilizing the synthetic persona to impersonate the target user during the deep dialog with the adversarial actor. For example, live user emails may be monitored for phishing attacks, and once a phishing attack is detected, a synthetic agent may impersonate or masquerade the live target and engage the adversarial actor. In some embodiments, the engaging in the deep dialog with the adversarial actor involves utilizing the synthetic persona to pivot the electronic communication exchanges from the target user to the synthetic persona during the deep dialog with the adversarial actor. For example, live user emails may be monitored for phishing attacks, and once a phishing attack is detected, the conversation may be pivoted from the live target to a synthetic agent not associated with the live target. Another deployment method may be to operate the social engineering attack detection system 100A in a mimicry mode, in which dialog agents intercede in the conversation on behalf of the live user. Generally, it is of high significance to keep an adversary engaged with a synthetic persona, instead of an actual person. Another example deployment strategy may be to use canary email accounts that may be distributed publicly on the Internet such that they will be harvested by spam and phishing email address capture systems. Such canary email addresses may then backstopped by the dialog engines 122 and synthetic personas 124, 126, and 128, of the social engineering attack detection system 100A.

Some embodiments involve engaging, by using a plurality of counterphishing dialog models, in a plurality of deep dialogs with another adversarial actor. Dialog engines 122 may be configured to communicate with adversarial actors at scale. In existing SEA systems, a message may be sent to an adversarial actor, and when the adversarial actor responds, the system may continue the conversation. However, the one or more dialog engines 122 described herein may deploy additional strategies. For example, a dialog engine may send a message to an adversarial actor, and if a message is not received from the adversarial actor, the dialog engine may follow up with another message. In some embodiments, a plurality of messages may be sent to the adversarial actor to entice the adversarial actor to initiate an SEA conversation. In some embodiments, dialog engines 122 may seek out the adversarial actor to engage in a conversation, as opposed to taking recorded messages.

Some embodiments involve determining, based on the plurality of deep dialogs, a plurality of dialog interaction elements. Strategies to determine the plurality of dialog interaction elements may involve ways to respond to unrecorded messages, response/follow-up timing strategies, a next message strategy (e.g., a content of the message, a tone, and so forth), and other strategies that entice the adversarial actor. Such embodiments involve identifying, based on an occurrence of the plurality of dialog interaction elements in the plurality of deep dialogs, an underlying conversational pattern. In some embodiments, SEA detection system 100A may be configured to design a counterphishing dialog model (e.g., based on latent patterns, attributes, a detected and/or evolving playbook, etc.). Such embodiments also involve determining, based on the underlying conversational pattern, another playbook associated with the other adversarial actor. For example, the counterphishing dialog model may include strategies to detect, thwart, and/or unravel a playbook deployed by the adversarial actor.

Message classifier 108, EDM 112, dialog engines 122, and so forth may be deployed interactively. Typically, later rounds of conversations reveal forensic signatures such as domain names, email addresses, social media accounts, and so forth. Some embodiments involve retrieving, from an electronic communications repository, a plurality of electronic communications that have been received within a prior time interval. For example, playbooks, attributes, and/or forensic signatures may be used to mine message inboxes for past emails (e.g., to detect missed threats), ongoing SEA conversations, and future emails (e.g., to proactively prevent future threats and/or SEA conversations). Such embodiments involve identifying, based on the playbook, a past attack or an ongoing attack by the adversarial actor. For example, message classifier 108 may analyze conversations to detect message patterns appearing from an adversarial actor during a current, past, or future engagement. For example, an inbound email may be undetected, but a subsequent or one or more later emails may be detected as a ransom attack, a coin fraud, and so forth. SEA detection system 100A may be configured to recognize a SEA conversation at later stages of a deep dialog.

Some embodiments involve identifying a conversational pattern from the deep dialog, wherein the conversational pattern comprises one or more dialog interaction elements utilized by the adversarial actor during the deep dialog. For example, deeper analysis may be performed by recognizing both individual conversations, as well as conversation threads in the deep dialog, along with associated thematics. In SEA schemes, primary attack teams typically deploy a counterphishing playbook. The counterphishing dialog model may generally refer to a conversation strategy used to engage a target and entice the target to reveal information.

Some embodiments involve dynamically producing, based on the identified conversational pattern, the playbook associated with the adversarial actor automatically, wherein the playbook is indicative of a dialog interaction strategy implemented by the adversarial actor. The playbook may include the steps that an adversarial actor may take to social engineer, such as cause someone to wiretap money, reveal bank or credit card details, divulge confidential information, and so forth. Playbooks deployed by adversarial actors may use common themes or strategies. Conversation analyzer 140 may analyze conversation threads to identify and classify different types of fraudulent schemes, such as, for example, scams related to credit cards, social security benefits, insurance benefits, tax compliance, and so forth.

For example, the adversarial actor may include an urgency indicator in the second round, followed by a flattery in the third round, followed by a message indicating consequences of not taking the directed action (e.g., send bank details) in the fourth round, and this may be followed with malicious statements, dire consequences, and/or threats in the sixth round, and so forth. SEA detection system 100A may label messages based on a round of the conversation, and one or more attributes associated with the round.

For example, a conversation may include several rounds. An initial message may be received by a target from an adversarial actor, and a response may be sent by the target (and/or a synthetic persona) to the initial message. This may constitute a first round of the conversation. The adversarial actor may respond with a second message, and a second response may be sent by the target (and/or a synthetic persona). This may constitute a second round of the conversation. Each round of the conversation may reveal an aspect of a playbook, and/or reveal additional attributes of the adversarial actor. The attributes may be labeled into classes. In some embodiments, message classifier 108 may use an ML classification model to detect patterns and generate additional classes.

For example, an ML model may be trained to classify messages, and label the message, and/or round with labels, such as "class 1," or "class 2 and class 7," and so forth. Such class labels may be indicators of various deployed playbooks. For example, an example playbook may include round 1=class 2; round 2=classes 2, 4; round 3=classes 2, 3; round 4=class 8, and so forth. Also, for example, ML models may be trained to recognize such playbooks. In some embodiments, counterphishing strategies, such as selection and/or deployment of synthetic persona, timing, content and/or a channel for a counterphishing message, and so forth may be designed based on a playbook.

Latent Attribute Detection

Attribute features 120 may be extracted by dialog engines 122, and EDM 112 may store the attribute features 120 in an attribute repository 130. Also, for example, conversation threads 132 may be extracted by dialog engines 122. The social engineering attack detection system 100A described herein can be configured to engage thousands of adversarial actors 110 in multi-round conversations. Accordingly, the social engineering attack detection system 100A produces an attribute repository 130 of forensic attribute features 120 that each dialog engine 122 may automatically extract from the conversation. These attribute features 120 can be separated into those exposed during an initial (or first) phishing email, and the set of latent attributes that are exposed by an adversary in subsequent emails, once the target is engaged. Further analyses can be performed to determine if the latent attribute features 120 are widely queriable on the Internet, or appear unique to an attack scheme.

Examples of latent attribute features 120 may include email addresses, universal resource locators (URLs), internet protocol (IP) addresses, a device identifier, a browser version, a version and/or type of operating system, phone numbers, contact names (e.g., first name, middle name, last name, nickname, alias, and so forth), an occupation, training, place of employment, employment history, a signature, a list social media accounts, tags, geographic location (e.g., city, country, postal code), and so forth. These attribute features 120 may constitute threat intelligence revealed by an adversary in later stages of the SEA conversation, and can form the basis of forensic signatures 136. In some embodiments, an attribute feature may be associated with a confidence score indicative of a level of confidence in the data related to the attribute. For example, an active phone number may be associated with a confidence level higher than a phone number that is no longer in use. Also, for example, an alias may be associated with a lower confidence score than a verified first and last name. As another example, an adversarial actor who has been identified before may be associated with a higher confidence score than a new adversarial actor. In some embodiments, the confidence score may be based on a detected playbook. For example, when one or more attributes are inferred based on a known playbook by an adversarial actor, the one or more attributes may be associated with a higher confidence score.

Forensic signatures 136 are generally revealed during later rounds of a multi-round conversation between a synthetic persona and an adversarial actor. The attribute features 120 and/or forensic signatures 136 may be harvested by the social engineering attack detection system 100A, and periodically delivered to an advanced counter-phishing system (e.g., feature detection system 142) that searches for such attribute features 120 in subsequent email conversations, and that may optionally also query prior email inboxes that had previously eluded anti-spam filters. In some embodiments, feature detection system 142 may include new methods for detecting active SEA conversations that may be in progress in an enterprise system, and to provide notifications, alerts, and/or warning indicators to targets of adversarial actors 110. In some embodiments, feature detection system 142 may proactively filter messages containing harmful attributes.

In some embodiments, conversation threads 132 and attribute features 120 may be used to create a new service, such as feature detection system 142. For example, an organization that provided enterprise security, and/or threat detection services, may be modified with a feature detection system 142 that is capable of identifying initial messages, groups of messages, and/or SEA conversations that may have been undetected, may be ongoing, and/or may be received in the future.

Conversation Heuristics

There are many potential natural language sentences and/or subject line patterns that can be used to detect SEA conversations. For example, the social engineering attack detection system 100A may receive auto-reply messages from adversarial actors 110 that produce an initial timely response to a target prior to the human adversary engaging in the thread with the target. In some cases, an uncommon auto-reply message from adversarial actors 110 may be used to derive heuristics that provide an indicator that the target has responded to a specific phishing campaign.

For example, a spear phishing call center may use an auto reply to let a target know that they are waiting for a response from the target before a human intervenes in, and/or initiates, a SEA conversation with the target. Accordingly, an auto-reply may be an indicator for a call center. As the adversarial actor customizes their strategy, this may indicate that the target may have responded to an initial email, and therefore be indicative of an undetected phishing attack.

Conversation Models

Conversation threads 132 may be generated by dialog engines 122 based on thousands of engagements with adversarial actors 110. Conversation threads 132 may be employed as a labeled set of phishing conversations. For example, messages may be associated with a phishing label, and a non-phishing label. Also, for example, a message may be labeled with a numerical indicator of a level in the conversation thread in which the message appears. Algorithms such as Tensorflow, machine classification, and so forth may be applied based on such labeled messages. For example, future messages, and/or conversation threads may be classified as being in the phishing set or the non-phishing set.

These labeled conversations can be combined with labeled sets of non-phishing email correspondence from validated sources and input into a machine learning based processing engine 134. For example, conversation threads 132 may be input into supervised ML classification libraries, including, but not limited to, Word2Vec, Attr2vec, Tensorflow, Pytorch, and Bayesian systems. The resulting ML classification models, along with other common anti-spam modeling techniques, can augment classic counterphishing products (and services), and provide forward and backward email processing tools capable of detecting SEA conversation threads that are currently not detected by existing anti-spam detection tools. ML may be used single messages, groups of messages, or for conversations. In some embodiments, two or three messages may enable a threshold ability to determine if a user is engaging in a SEA conversation.

EDM 112 may incorporate stop logic to determine whether to continue or terminate a conversation. For example, a threshold for a maximum number of unrecorded messages may be used (e.g., no more than 7 unrecorded messages), a total number of overall messages may be used (e.g., the total number of messages in a conversation may not exceed more than 100 messages), a time duration (e.g., the conversation does not span longer than two months) may be used. In some embodiments, stop words in a message may be an indicator for a conversation to be terminated. For example, indicators such as "please leave us alone," "I didn't send the message," "please stop spamming me," and so forth, may cause EDM 112 to terminate the conversation. Additional and/or alternative indicators that indicate that the adversarial actor has been incorrectly identified may be used. For example, an individual's email may have been hacked by an adversarial actor, and EDM 112 may detect and terminate a further SEA conversation with such an individual. As described herein, in some embodiments, ML models may be trained based on supervised learning with inputs from human supervision.

Natural Language—Thematic Labeling

In some embodiments, a thematic label may be generated on a per message basis that can be used to infer an adversarial playbook model 138. Many phishing attacks are launched by call centers or organized teams, such as criminal organizations, or nation states. Such attack teams tend to follow playbooks based dialog interaction strategies such as repeated and/or sequential use of one or more dialog interaction elements that may be used against the target user. For example, dialog interaction elements (or verbal gestures in an electronic message, or message thematics) such as flattery, urgency, a threat, use of abusive language, issuance of an ultimatum, a payment then reward strategy, presenting a financial opportunity, providing an anonymous contact point, a personal protected information (PPI) request, a payment stipulation, a recipient recrimination, an alternate contact modality, or an indication of waiting for a response, etc. may be used. In some embodiments, such dialog interaction elements may be auto-harvested from natural language classification systems using supervised learning. A playbook may be responsive to a target's response, or a lack thereof. The strategies described herein may be agnostic to a particular natural language.

An example of conversation threads 132 may be "my name is Mr. Oscar Mark from the FBO office. The U.S. government is compensating all the scam victims and unpaid salaries, and your phone number was submitted. The government handed over your funds to the IMF to be delivered to you." The statement "[t]he government handed over your funds to the IMF to be delivered to you" may be an example of a gesture label for "financial opportunity" that can be harvested from conversation threads 132. A second example of conversation threads 132 may be "I have received your email, but you don't have to delay much on this because we have no time to wait. So do not delay to avoid cancellation of your payment file here. So, now get back to me with your full address like I said before. Thanks." In this example, the statement "[s]o do not delay to avoid cancellation of your payment file here" may be an example of a gesture label for "urgency" that can be harvested from conversation threads 132.

A third example of conversation threads 132 may be "I have received your email, but you don't have to delay much on this because we have no time to wait. So try not to delay to avoid cancellation of your payment file here, so now please send me your full address like I said before. Thanks." In this example, "send me your full address" may be an example of a gesture label for "PPI" that can be harvested from conversation threads 132. A fourth example of conversation threads 132 may be "You don't have what? I just need to confirm your full address to avoid wrong delivery and after I will tell you the next step. So you have to hurry up because you are now wasting my time." In this example, "hurry up because you are now wasting my time" may be an example of a gesture label for "recrimination and urgency" that can be harvested from conversation threads 132. Another example of conversation threads 132 may be "I received your email! Here is my WhatsApp number (+17738013701) so you can call me up and text me immediately for more information. Looking forward to hearing from you soon." In this example, "(+17738013701)" may be an example of a gesture label for an "anonymous contact point" that can be harvested from conversation threads 132.

These message-level labels may be integrated into a conversation analyzer 140 that produces a probabilistic assessment of multi-round conversations. In some embodiments, playbook models 138 may be inferred from a sequence, and/or a combination of message-level labels that appear during conversations between potential targets and unknown interlocutors. Sequences of harvested SEA conversations from the social engineering attack detection system 100A form the malicious-labeled inputs that can be employed by natural language classification systems to reveal common malicious call-center playbooks.

Figure 1B:
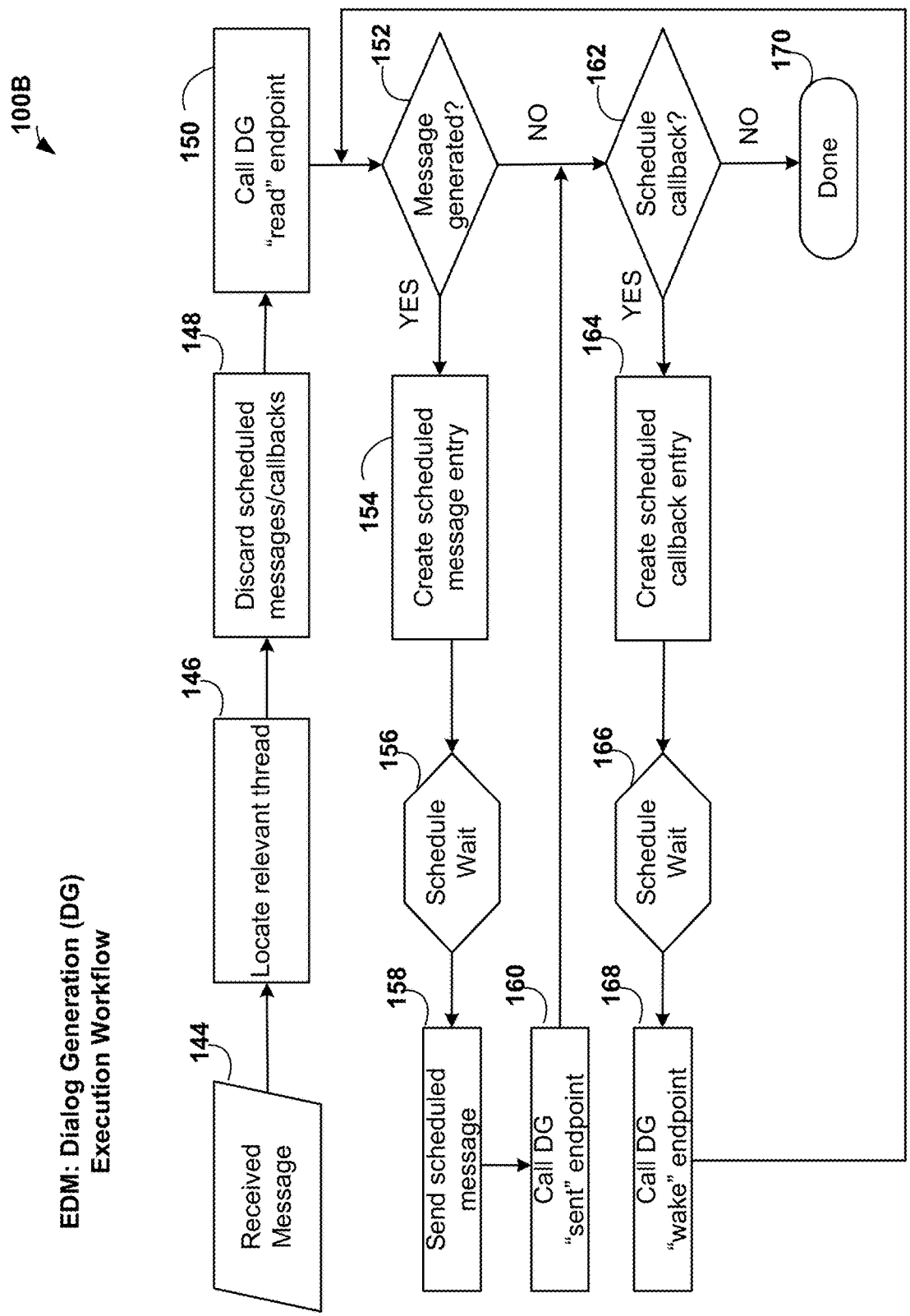
FIG. 1B illustrates an example dialog generation execution workflow, in accordance with example embodiments.

FIG. 1B illustrates an example dialog generation execution workflow 100B, in accordance with example embodiments. A phishing message may be received at block 144. At block 146, a relevant conversation thread may be located in the message. At block 148, scheduled messages and/or callbacks may be discarded. Generally, follow-up messages and/or callbacks may be have been scheduled in the event that new messages are not received; however, receipt of a new message may cause the scheduled messages to be discarded in favor of a new response.

At block 150, the workflow algorithm may call a dialog generation (DG) "read" endpoint to read the incoming message and generate a new message. At block 152, it may be determined whether a response message has been generated. Upon a determination that a response message has been generated, at block 154, a scheduled message entry task may be created. At block 156, a scheduled wait time may be determined (and a wait task may be created) that indicates a waiting time prior to sending the generated message. At block 158, upon expiration of the scheduled wait time, the scheduled message may be sent.

At block 158, the workflow algorithm may call a dialog generation (DG) "sent" endpoint to indicate that the scheduled message has been sent, and the workflow may proceed to block 162. The workflow may also proceed to block 162 upon a determination that the response message has not been generated. At block 162, it may be determined whether a callback is to be scheduled. Upon a determination that a callback is to be scheduled, at block 164, a scheduled callback entry task may be created. At block 166, a scheduled wait time may be determined (and a wait task may be created) that indicates a waiting time prior to making the callback. At block 168, upon expiration of the scheduled wait time, the workflow algorithm may call a dialog generation (DG) "wake" endpoint to indicate that the wait time has expired and a callback is to be made. The workflow algorithm then proceeds to block 152. Upon a determination that the callback is not to be scheduled, the workflow algorithm terminates at block 170.

FIG. 2A depicts an example dialog manager 200A, in accordance with example embodiments. Dialog manager 200A may be provided by a graphical user interface of a computing device. In some embodiments, dialog manager 200A may include a plurality of rows (e.g., R1, R2, R3) one for each chain of communications between a synthetic persona and an adversarial actor. Although three rows are shown for illustrative purposes, in practice, dialog manager 200A may include thousands of rows. In some embodiments, dialog manager 200A may include a plurality of columns (e.g., column 1, column 2, and so forth). As illustrated, column 1 may display entries indicating an identifier, column 2 may display entries that indicate a date, time, range, and/or time period for communications between the synthetic persona and the adversarial actor. For example, the entry in R1, column 2 is "10-30; 23:44" indicating that the communication took place on October 30 at 11:44 PM. Also, for example, the entry in R3, column 2 is "08-25; 07:18 to 09-07; 06:12," indicating that the communications took place between August 25 at 7:18 AM and September 7 at 6:12 AM.

Column 3 may display a total number of messages of each type that are exchanged. This may be a sum of the number of incoming messages (displayed in column 4) and the number of smart responses (displayed in column 6). For example, the entry in R1, column 4 is "1 email," and the entry in R1, column 6 is "7 emails," and the total number "8 emails" is displayed in R1, column 3. As another example, the entry in R2, column 4 is "2 texts," and the entry in R2, column 6 is "3 texts, 2 emails," and the total number "5 texts, 2 emails" is displayed in R2, column 3. The term "smart responses" here indicates a number of messages generated by the social engineering attack detection system 100A, and sent by a synthetic persona.

Column 5 may display indicators associated with the conversation. For example, the entry in R1, column 5 is "4255 attribute lines, flags" indicating that 4255 attributes have been extracted. Also, for example, column 7 may display extracted information, such as, for example, a name, an entity, a number of undeliverable messages, and so forth.

Column 8 may display a forensic signature, such as, for example, a device identifier of a device that is used by an adversarial actor to engage in the conversation. As illustrated, the entries in R1 and R3 under column 8 are identical, "B8D5XXX2," even though the extracted information in column 7 is different. Accordingly, this may indicate a playbook strategy of the adversarial actor, such as, for example, a willingness to engage in a conversation, a preference for a messaging application (e.g., electronic mail), and so forth.

Column 9 may display additional forensic signatures, such as, for example, an IP address, a geolocation, and/or whether the internet service provider (ISP) is proxied or not. In some embodiments, a profile for an adversarial actor may be generated based on similarities between R1 and R3 (e.g., in columns 8 and 9). In some embodiments, column 10 may display an email address for an adversarial actor.

Generally, a longer duration of engagement with an adversarial actor may result in more information content, such as, an email address, a URL link, or some flag, an indication of a method of communication, contact information, and so forth.

One or more of the contents in any of columns 1 to 10 may be user-selectable. For example, the time displayed in R1, column 2 may be selectable. A user (e.g., a network administrator, a security personnel) may be able to select the displayed time and navigate to a page, or view as a pop-up or other display, additional information related to the time of the communication chain. As another example, the entry "7 emails" in R1, column 6 may be selectable, and a user may select "7 emails" to view contents of the email messages.

FIG. 2B depicts another example dialog manager 200B, in accordance with example embodiments. In some embodiments, a dialog manager view may display information related to a communication chain. For example, dialog manager 200B may include details about received messages in a received messages list 205, and about sent messages in a sent message list 210. Also, for example, dialog manager 200B may include one or more attributes 215, such as, for example, demographic information (e.g., languages, gender), personal information of the hostile actor (e.g., first name, last name, middle name), income information (e.g., income and currency), email information of the target individual, occupation of the hostile actor, employment information (e.g., Z Development Bank in City Z), telephone numbers, geographic location, and so forth.

Figure 3A:
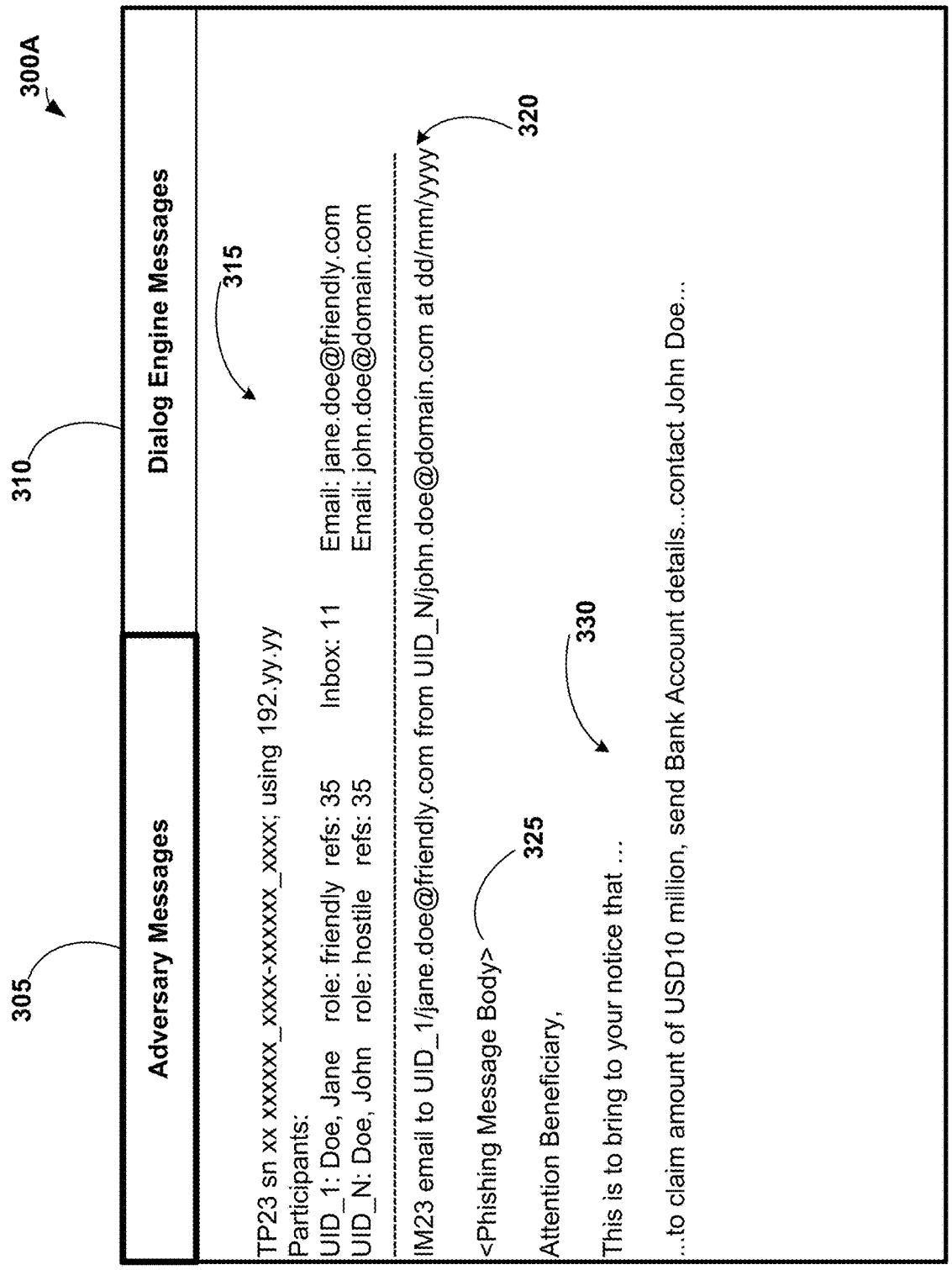
FIG. 3A depicts an example automated dialog engagement, in accordance with example embodiments.

FIG. 3A depicts an example automated dialog engagement 300A, in accordance with example embodiments. In some embodiments, a dialog manager view may display at least two tabs, one for "Adversary Messages" 305 and another for "Dialog Engine Messages" 310. When an "Adversary Messages" 305 tab is selected, one or more messages may be displayed, along with information related to the one or more messages. The one or more messages may correspond to messages that were not filtered by an enterprise counterphishing system (e.g., enterprise counterphishing system 102 of FIG. 1A).

For example, information 315 indicates attributes of an adversarial message, including, identifiers for a sender and a recipient, an IP address for the sender, and so forth. A header 320 may indicate the type of message (e.g., email), an email address for a recipient (e.g., UID_1/jane.doe@friendly.com), and an email address for the sender (e.g., UID_N/john.doe@domain.com), and a time stamp (e.g., dd/mm/yyyy). An example adversary message is displayed with a message body 325 and message content 330.

Figure 3B:
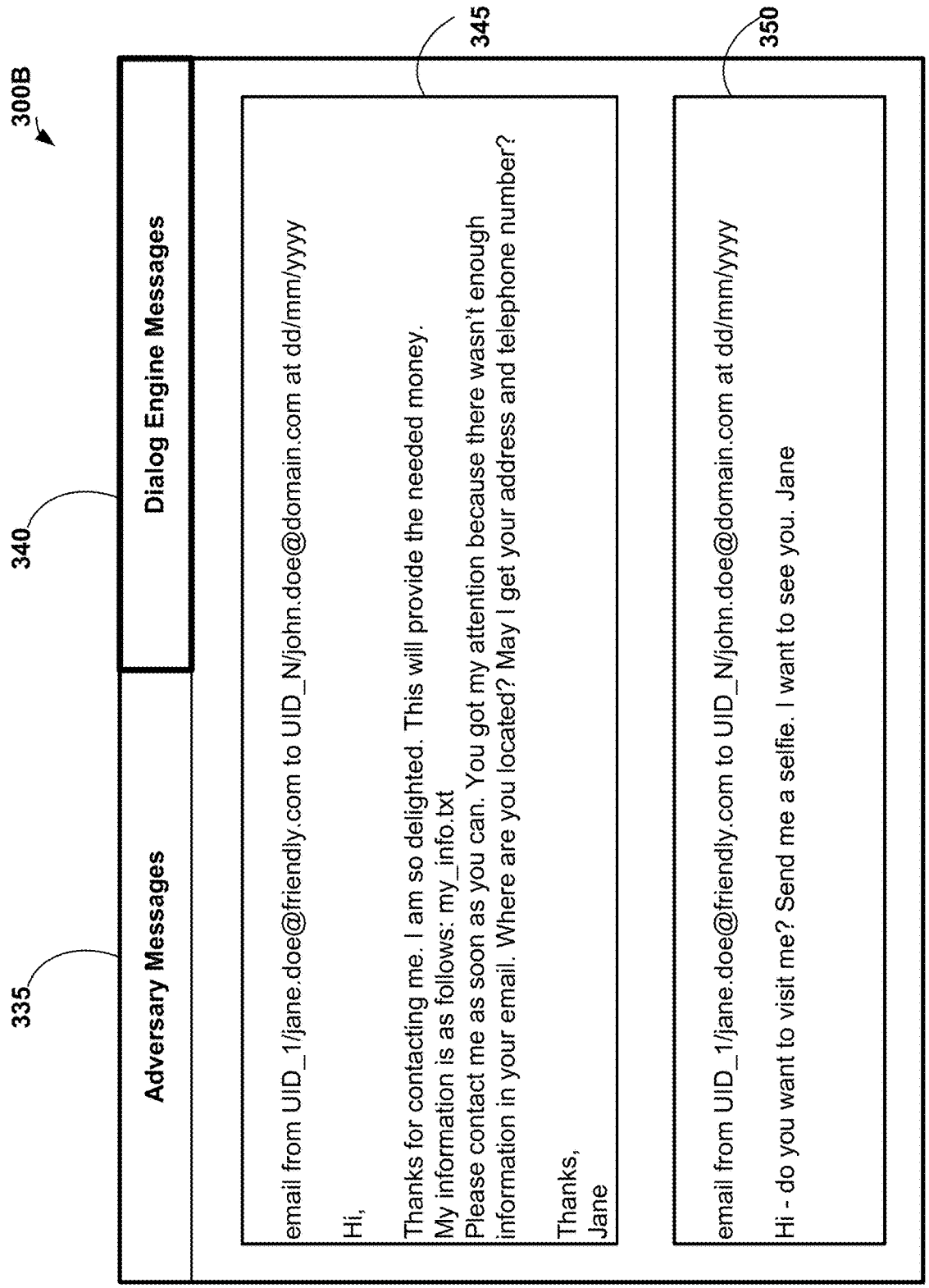
FIG. 3B depicts an example automated dialog engagement, in accordance with example embodiments.

FIG. 3B depicts an example automated dialog engagement 300B, in accordance with example embodiments. In some embodiments, a dialog manager view may display at least two tabs, one for "Adversary Messages" 335 and another for "Dialog Engine Messages" 340. When a "Dialog Engine Messages" 340 tab is selected, one or more messages may be displayed, along with information related to the one or more messages. The one or more messages may correspond to messages that were generated by the social engineering attack detection system 100A, and sent by a synthetic persona. For example, first message 345 may be an initial response to an adversary message (e.g., the message with a message body 325 and message content 330 of FIG. 3A). In some embodiments, first message 345 may be composed to indicate an interest in engaging with the adversarial actor. As illustrated, second message 350 may be a friendlier message requesting more information from the adversarial actor.

Some embodiments involve determining, by the computing device and based on the deep dialog, a forensic signature associated with the adversarial actor. For example, the social engineering attack detection system 100A may be designed for an extended adversarial engagement, to extract as much information as possible. Generally, a longer engagement provides more labeled data (e.g., attribute features, conversation threads) that result in more accurate forensic signatures 136, better playbook models 138, and/or more accurate conversation predictors. Once communication is established, the social engineering attack detection system 100A may seek knowledge associated with the adversarial actor. In some embodiments, the social engineering attack detection system 100A may entice the adversarial actor by providing "honey traps" (e.g., monitored accounts, servers and/or devices that the adversarial actor may be lured to visit), "honey links" (e.g., links to monitored websites that the adversarial actor may be lured to visit), live directories (e.g., a PDF document, an excel spreadsheet, live documents with micros), and so forth. Engaging the adversarial actor in this manner increases a likelihood of detecting forensic signatures that can identify the adversarial actor.

In some embodiments, the techniques described herein involve the mining of latent attributes and dialog patterns that are exposed by the adversary once targets are engaged.

For example, the social engineering attack detection system 100A may identify an adversarial actor, a geographical region, and/or can fingerprint a device used by an adversarial actor. Accordingly, strategies, phrases etc. may be identified, and automatically generated messages may be identified. In some embodiments, language models may be generated that capture what the adversary does subsequent to the first message. In some embodiments, the social engineering attack detection system 100A may recognize when the adversarial actor may pivot the conversation to a threat, to flattery, to further engagement, and so forth, and thereby reverse engineer a playbook used by the adversarial actor.

In some embodiments, the social engineering attack detection system 100A may recognize when the adversarial actor may pivot from an automated engagement to a human interaction. For example, the social engineering attack detection system 100A may detect scripted messages, and messages that are off-script (e.g., messages that indicate anger, curses, and threats, suggest an urgency for a response, and so forth).

In some implementations, the goal of the social engineering attack detection system 100A is not to identify the adversarial actor, but to reverse engineer the one or more playbooks used by the adversarial actor. Although the words and/or phrases of an individual message may not provide sufficient information about the attack strategies employed, once a playbook is reverse engineered, the same adversarial actor may be identified even when attacking from a different IP address, device identifier, geographical region, etc. For example, a sophisticated group may deploy a playbook to attack a financial division of a first enterprise. The same group may deploy the same playbook to attack another division of a second enterprise. In some aspects, the group may carry out the two attacks under different guises. However, based on historical patterns of keywords, strategies, curses, threats, urgencies, time to escalate to a next level, and so forth, heuristic and probabilistic models may be generated that identify common themes indicative of an underlying playbook. Based on such a playbook, the attack on the second enterprise may be averted.

In some embodiments, forensic signatures 136 may be utilized to build and/or update feature detection system 142. This may strengthen enterprise security platform 104, by enabling more refined corporate filtering strategies, and/or policies. Also, for example, message classifier 108 may be updated to perform a pre-analysis of messages from a spam folder by setting a definition of a likely responder, tagging a message likely to have a legitimate human as a sender, incorporate into a message filter, add phonetic labels, and so forth. In some embodiments, such functionality may be achieved by fuzzy experts and/or ML models.

In some embodiments, playbook models 138 may be used to build a social engineering attack model. For example, such a model may be used to detect malicious messages, emulate adversarial activity, and so forth. In some embodiments, playbook models 138 may be used to create intelligent business virtual assistants or chatbots. For example, the chatbots may be configured to incorporate knowledge about an organization, and provide responses to queries about the organization.

In some embodiments, a system-wide social engineering attack detection system 100A may be deployed in a live enterprise. Also, for example, a social engineering attack detection system 100A may be deployed in the cloud.

Figure 4A:
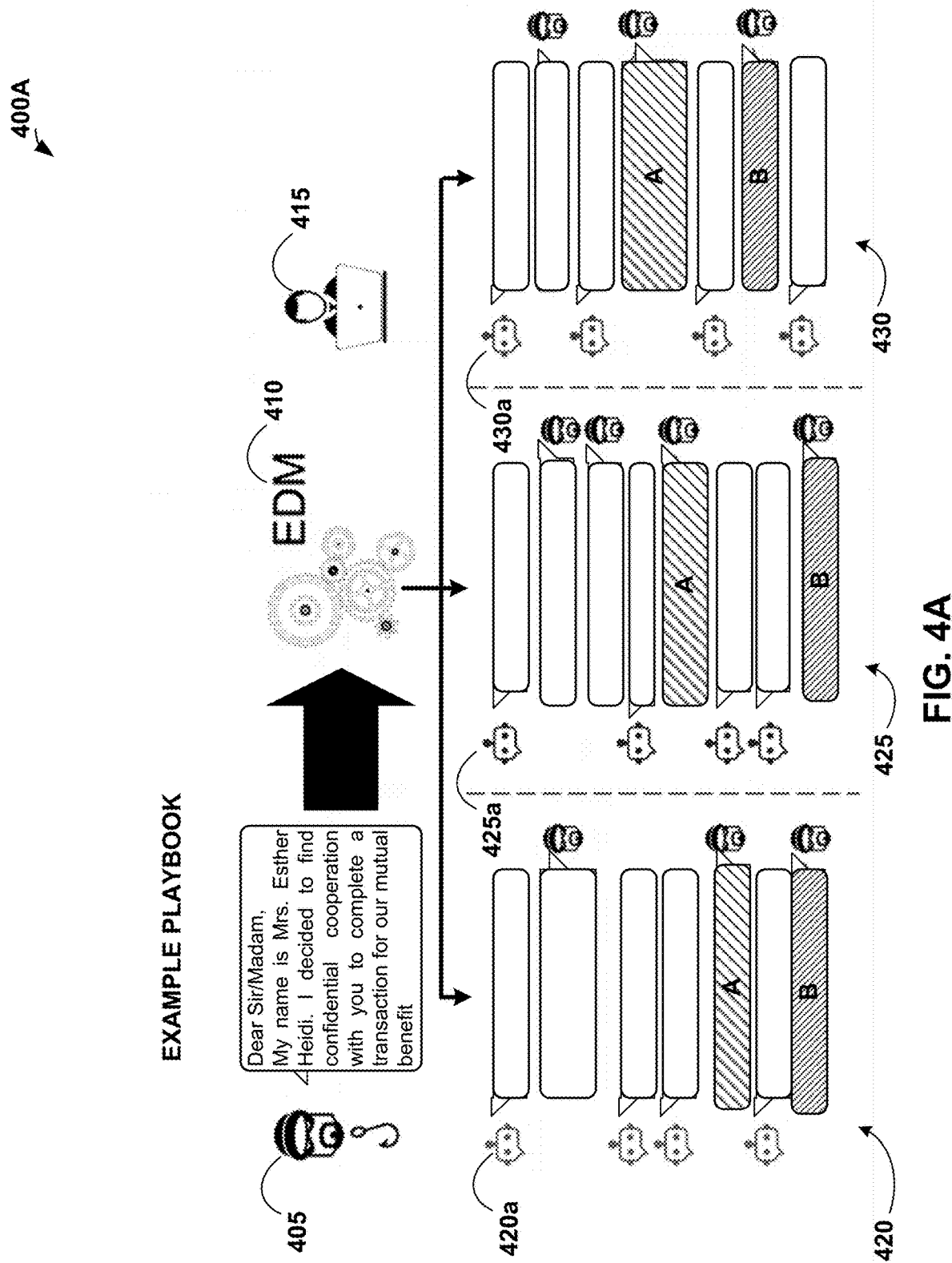
FIG. 4A depicts an example playbook, in accordance with example embodiments.

FIG. 4A depicts an example playbook 400A, in accordance with example embodiments. An adversarial actor, such as phisher 405, may initiate a message intended for recipient 415. The message may be intercepted by an ensemble dialog manager, EDM 410 (e.g., ensemble dialog manager 112). Phisher 405 may target different users (e.g., at different times, across organizations, geographic locations, etc.), and EDM 410 may deploy different synthetic persona (e.g., based on one or more dialog models) to engage in the different sets of conversations (or dialogs) with phisher 405.

For example, a first conversation set 420 may involve a first synthetic persona 420a, a second conversation set 425 may involve a second synthetic persona 425a, and a third conversation set 430 may involve a third synthetic persona 430a. In some embodiments, each round of the deep dialog may indicate a conversation depth. For example, a message exchange in a first round is at conversation depth 1, a message exchange in a tenth round is at conversation depth 10. Some embodiments involve detecting, from the deep dialog, at least one respective dialog interaction element associated with a respective incoming message from the adversarial actor during a respective round of the electronic communication exchanges, and the identifying of the conversational pattern comprises associating an occurrence of the at least one respective dialog interaction element with the conversation depth of the respective round.

Figure 4B:
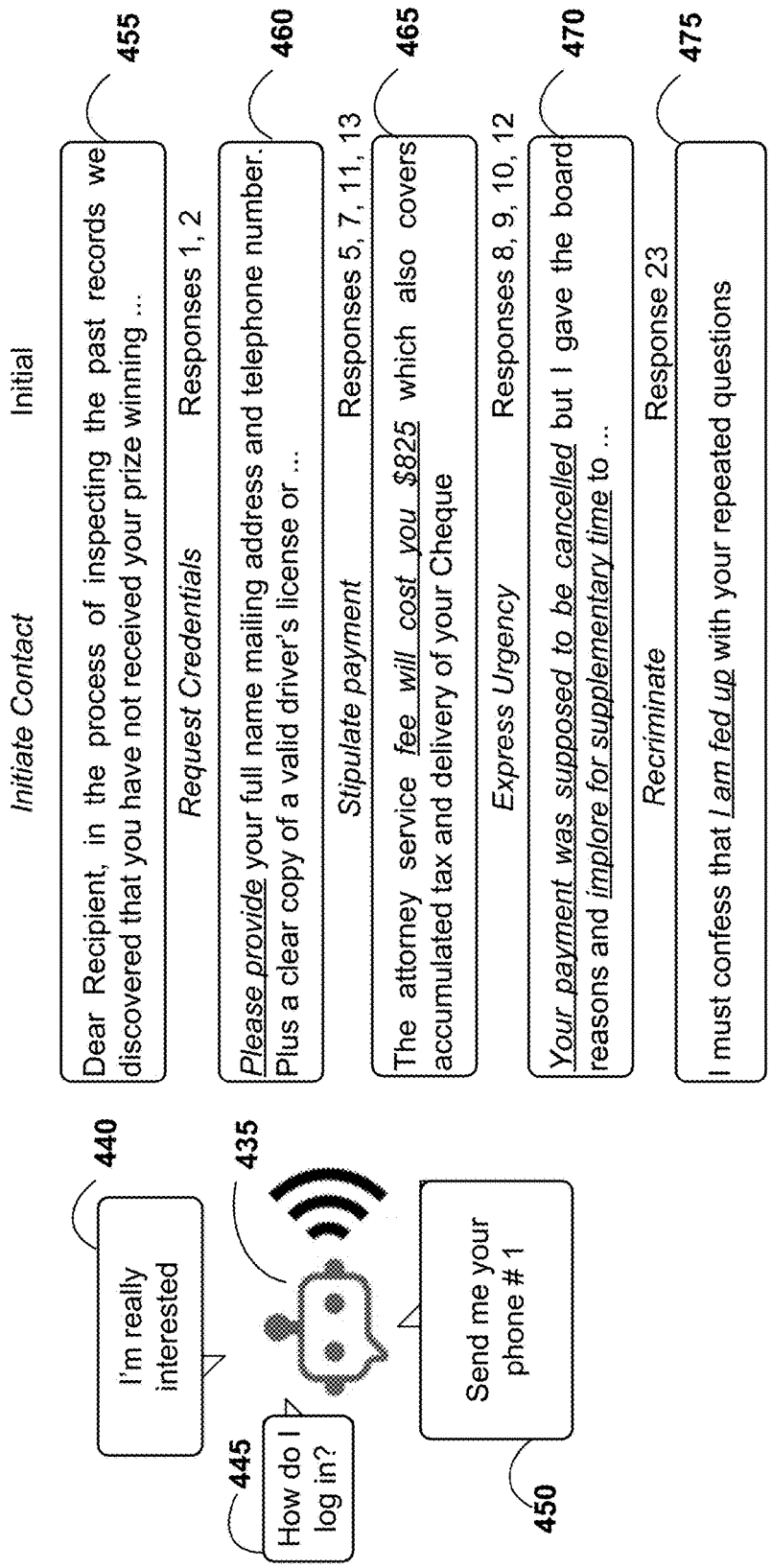
FIG. 4B depicts an example phishing attack pattern, in accordance with example embodiments.

As illustrated, each conversation set may follow a pattern such as a message of type A followed by a message of type B. The actual position of the message in the conversation may be different, and the actual content of the message may be different. For example, the pattern may follow a request for payment with a recriminating message. Although a pattern with two types of messages is shown for illustrative purposes, the pattern may involve multiple types of messages. A playbook model may be generated based on the detected pattern, and the playbook model may be associated with phisher 405. FIG. 4B illustrates different types of messages that may be sent. For example, "A" and "B" could be any combination of the types of messages illustrated in FIG. 4B.

Some embodiments involve determining that the dialog interaction strategy of the playbook matches a known dialog interaction strategy associated with a known adversarial actor. Such embodiments involve identifying the adversarial actor as the known adversarial actor. For example, the playbook s may be classified and grouped (e.g., using a trained classifier) and various phishers may be associated with various classes of playbooks, indicating similar phishing strategies. For example, a specific class may help identify a particular phisher, and the playbook corresponding to that identified class may be used to generate the dialogs to engage with the phisher.

FIG. 4B depicts an example phishing attack pattern 400B, in accordance with example embodiments. For example, phisher 435 may send multiple messages, such as a first message 440 stating "I'm really interested," a second message 445 stating "How do I log in?", a third message 450 stating "Send me your phone #1," and so forth. Different types of messages may be sent.

A first type of message 455 may involve initiating contact with a target user. First type of message 455 may be a variant of "Dear Recipient, in the process of inspecting the past records we discovered that you have not received your prize winning . . . " and may be sent as an initial message.

A second type of message 460 may be a message that requests credentials. Second type of message 460 may be a variant of "Please provide your full name mailing address and telephone number. Plus a clear copy of a valid driver's license or . . . " and may be sent as part of responses 1 or 2 in a dialog. For example, the phrase "please provide" indicates a request for information, and the phrase "full name mailing address and telephone number" indicates types of information being requested.

A third type of message 465 may be a message that stipulates a payment. Third type of message 465 may be a variant of "The attorney service fee will cost you $825 which also covers accumulated tax and delivery of your Cheque" and may be sent as part of responses 5, 7, 11, or 13 in a dialog. For example, the phrase "fee will cost you $825" indicates a payment of $825 being stipulated.

A fourth type of message 470 may be a message that expresses urgency. Fourth type of message 470 may be a variant of "Your payment was supposed to be cancelled but I gave the board reasons and implore for supplementary time to . . . " and may be sent as part of responses 8, 9, 10, or 12 in a dialog. For example, the phrase "Your payment was supposed to be cancelled" indicates a delay in payment, and the phrase "and implore for supplementary time" indicates an urgency in making the payment.

In some embodiments, message that expresses urgency may be followed by one or more messages that display recrimination. For example, fifth type of message 475 may be a message that expresses recrimination. Fifth type of message 475 may be a variant of "I must confess that I am fed up with your repeated questions" and may be sent as part of response 23 in a dialog. For example, the phrase "I am fed up" indicates recrimination. EDM 410 may detect such message types and build a pattern based on an occurrence of these types of messages.

Generally, a second, third, fifth, or ninth round of a conversation may begin to yield patterns, and EDM may recognize elicited attributes, gestures, and build a thematic analysis of the entire conversation.

Figure 5:
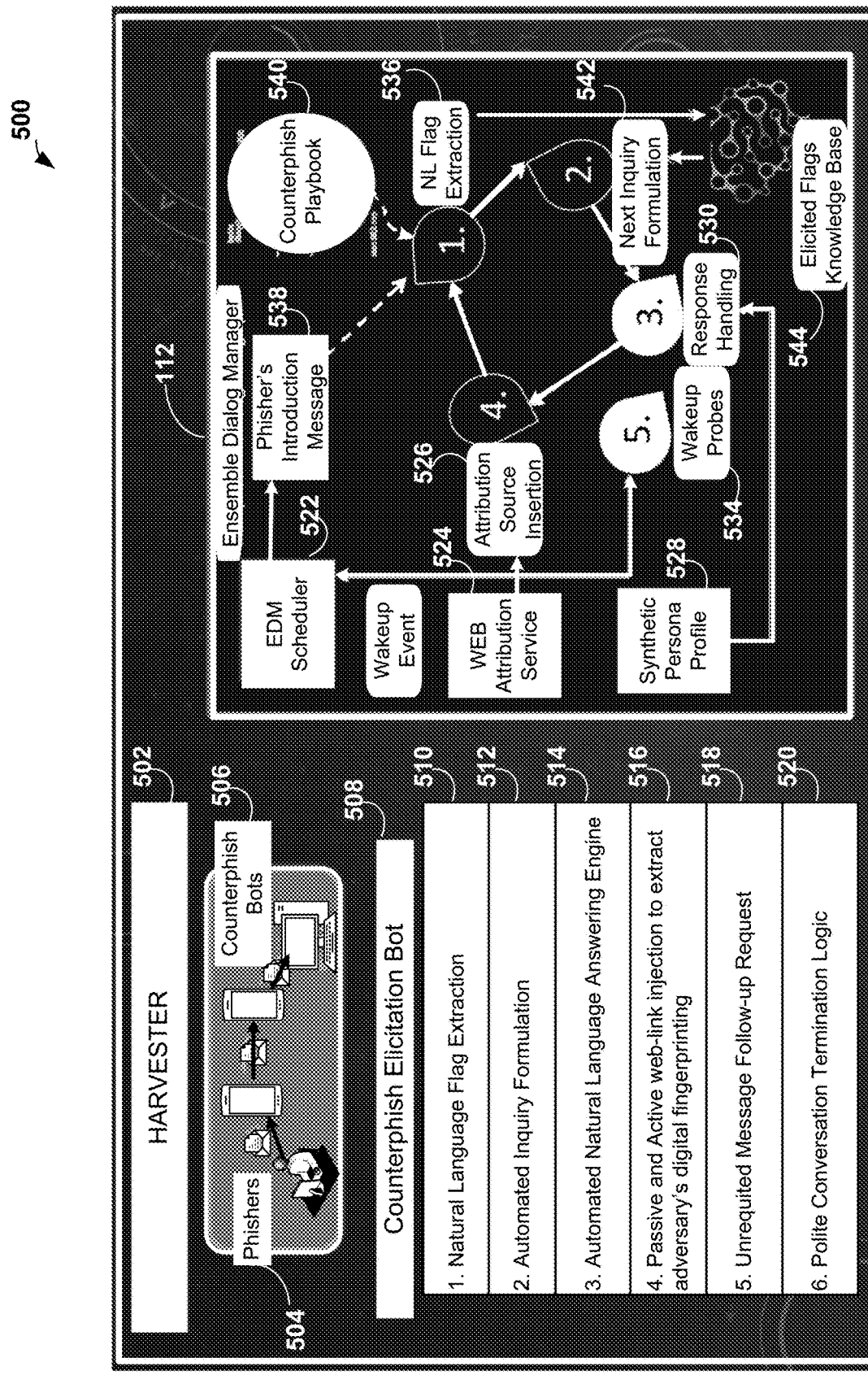
FIG. 5 depicts an example harvester, in accordance with example embodiments.

FIG. 5 depicts an example harvester system 500, in accordance with example embodiments. Harvester system 500 comprises a harvester 502 and an ensemble dialog manager 112. Harvester 302 monitors communications between phishers 504 and counterphish bots 506. Counterphish elicitation bot 508 extracts data from the communications between phishers 504 and counterphish bots 506. For example, counterphish elicitation bot 508 performs natural language flag extraction 510, automated inquiry formulation 512, executes automated natural language answer engine 514, passive and/or active web-link injection to extract an adversary's digital fingerprinting 516, follow-up requests on unrequited messages 518, and/or execute polite conversation termination logic 520.

Enterprise dialog manager (EDM) scheduler 522 initiates phisher's introduction message 538. At step 1, phisher's introduction message 538 and playbooks from counterphish playbook 540 are received, and counterphish elicitation bot 508 performs natural language flag extraction 536. The extracted flags are provided to knowledge base 544. At step 2, counterphish elicitation bot 508 performs automated inquiry formulation 512 based on data from knowledge base 544. At step 3, counterphish elicitation bot 508 performs response handling 530 based on the automated inquiry generated by automated inquiry formulation 512 and synthetic personal profile 528. At step 4, counterphish elicitation bot 508 performs attribution resource insertion (e.g., passive and/or active web-link injection to extract an adversary's digital fingerprinting 516), based on resources retrieved from web attribution service 524. And the process proceeds to step 1. EDM scheduler 522 communicates with wake-up probes 534 at step 5, to trigger follow-up requests on unrequited messages.

Figure 6:
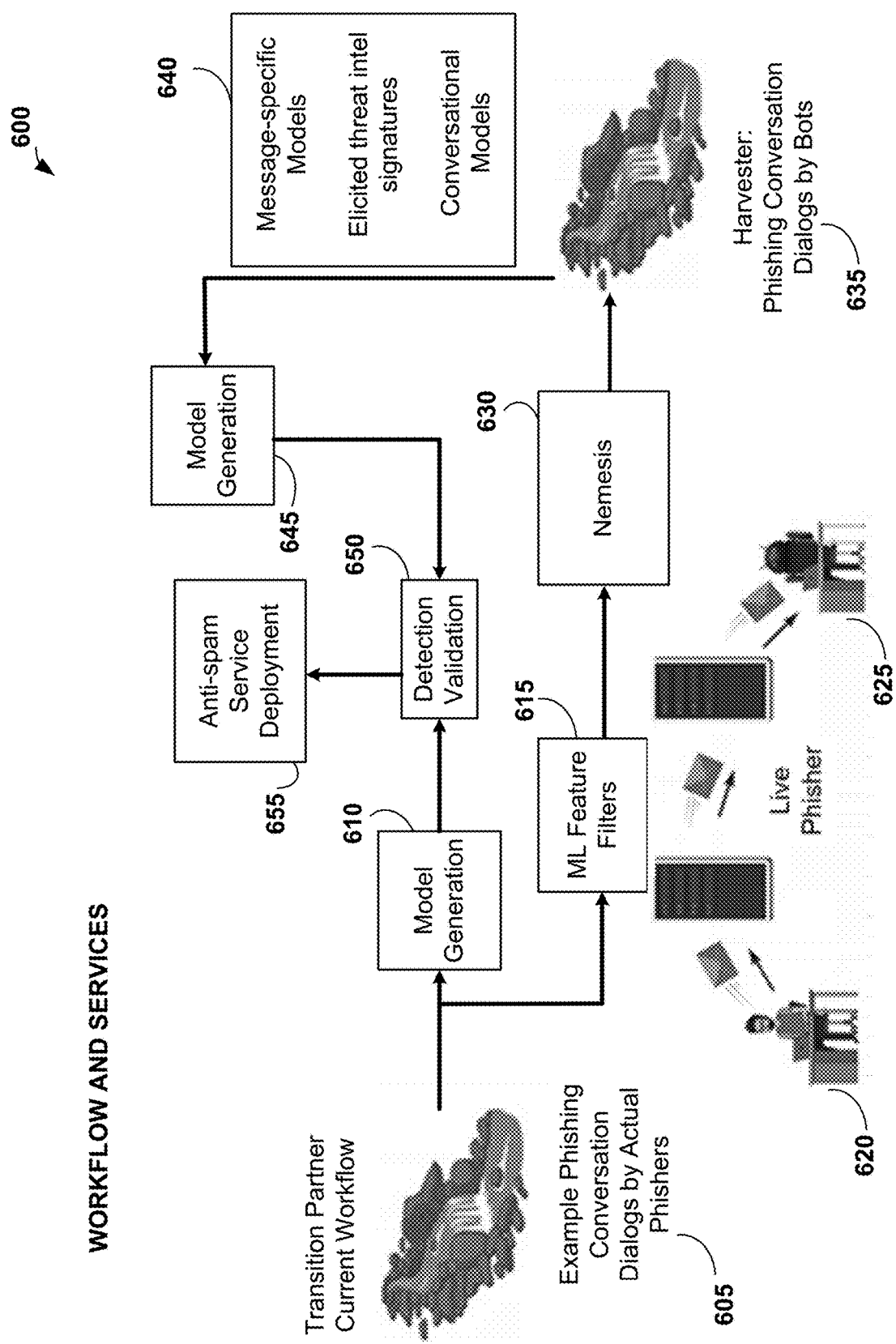
FIG. 6 depicts an example harvester workflow, in accordance with example embodiments.

FIG. 6 depicts an example harvester workflow 600, in accordance with example embodiments. For example, a current workflow for a transition partner may include a database 605 of example phishing conversation dialogs with actual phishers. Based on database 605, a model may be generated at block 610, and features for machine learning algorithms may be filtered at block 615. For example, at block 615, a plurality of features may be extracted from conversations between a target user 620 and a phisher 625. The extracted features may be provided to nemesis at block 630, and at block 635, harvester may engage (e.g., in lieu of target user 620 or by pivoting the conversation away from target user 620) in one or more phishing conversations with phisher 625 by engaging a plurality of synthetic persona or bots (e.g., dialog models).

At block 640, one or more message specific models may be generated. Also, for example, forensic signatures, threat intelligence signatures, and so forth may be extracted. In some embodiments, conversational models may be generated. At block 645, model generation may be performed based on harvester operations performed at block 635. The model generated at block 610 (based on database 605, and the model generated at block 645 may be compared, and detection validation may occur at block 650. The anti-spam deployment may occur at block 655.

Example Machine Learning Models

Figure 7:
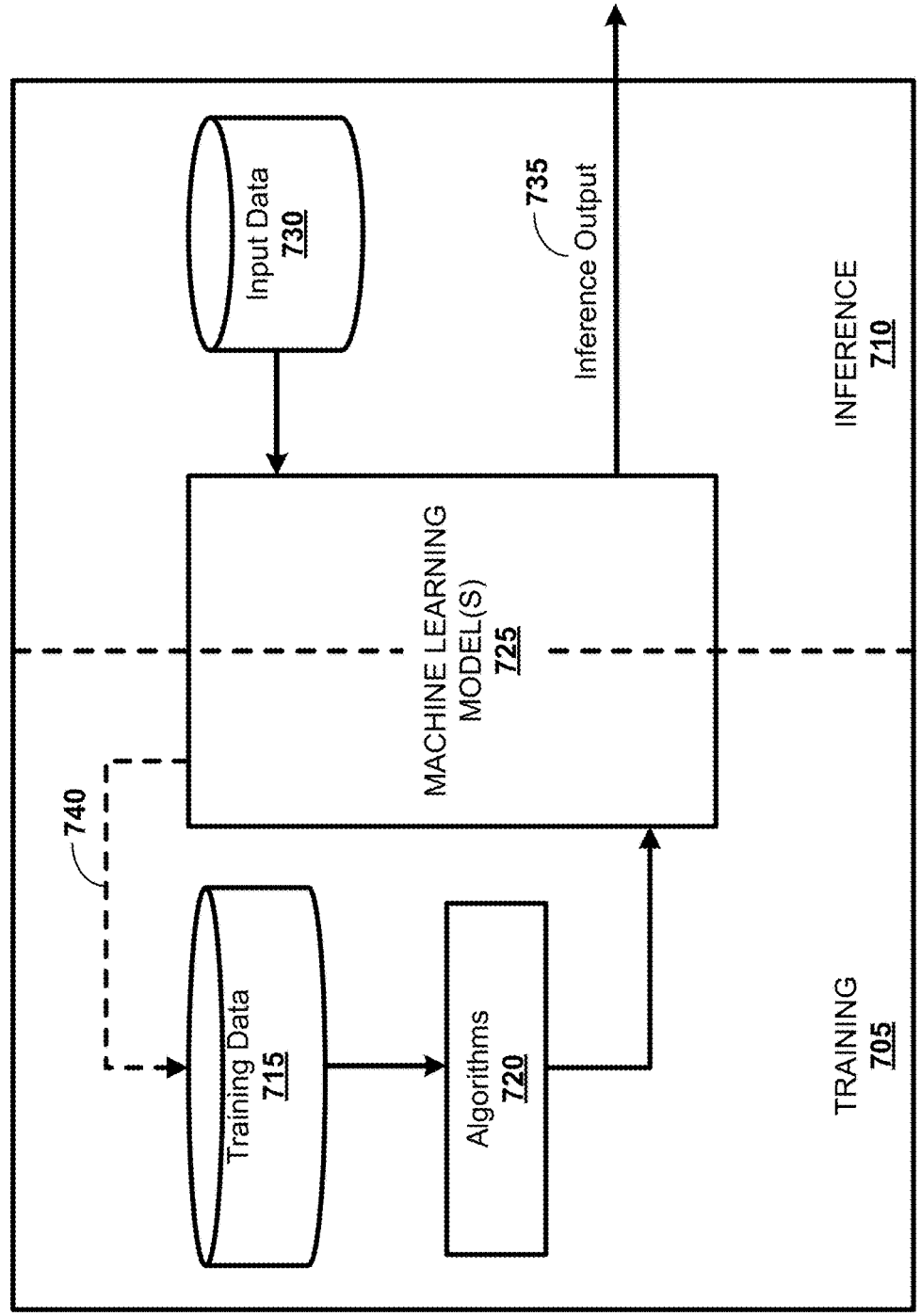
FIG. 7 shows a block diagram depicting training and inference phases for an example machine learning model, in accordance with example embodiments.

FIG. 7 shows a block diagram 700 depicting training and inference phases for an example machine learning model, in accordance with example embodiments. As described herein, one or more machine learning models may be trained and deployed to perform the tasks. For example, message classifier 108 may include a trained classifier. Also, for example, dialog engines 122 may include a trained model that generates an appropriate synthetic persona, generates responses, and engages an adversarial actor in a conversation. Trained models may also be used to identify playbook models 138, extract forensic signatures 136, and perform functions of the conversation analyzer 140, and/or the feature detection system 142.

Block diagram 700 include a training phase 705 and an inference phase 710. Generally, machine learning models 725 are trained during the training phase 705 by using training data 715. In some embodiments, machine learning models may be trained by utilizing one or more machine learning algorithms 720 that are applied to training data 715 to recognize patterns in the input data 730 and output the inference output 735. Training data 715, the one or more algorithms 720, or both, may depend on a particular machine learning model, its expected functionality, a desired precision, a desired efficiency, a desired accuracy, available computing resources, and so forth. During the inference phase 710, the trained machine learning models 725 receive input data 730 and generate predictions or an inference output 735 about input data 730.

As described herein, inference output 735 may include a label associated with an incoming message (based on a trained classifier). Also, for example, inference output 735 may include a predicted playbook model. In some embodiments, inference output 735 may include an automated response to an incoming message. In some embodiments, inference output 735 may include generating conversation threads, forensic signatures, and so forth. Also, for example, inference output 735 may include an output of a feature detection system (e.g., feature detection system 142).

Algorithms 720 may include, but are not limited to artificial neural networks (e.g., convolutional neural networks, recurrent neural networks, a Bayesian network, a hidden Markov model, a Markov decision process, a logistic regression function, a support vector machine, a statistical machine learning algorithm, and/or a heuristic machine learning system). Algorithms 720 may involve supervised, unsupervised, semi-supervised, and/or reinforcement learning techniques. Machine learning models 725 may involve natural language processing (NLP), natural language understanding (NLU), natural language grammar (NLG), or any combination thereof. In some embodiments, machine learning models 725 may be updated based on the inference phase 710, and training data 715 may be updated via feedback loop 740.

In some embodiments, machine learning models 725 and/or algorithms 720 may be located within one computing device, or in a shared computing environment (e.g., computing environment 1000). In some embodiments, machine learning models 725 and/or algorithms 720 may be a part of a distributed computing architecture, such as one or more cloud servers. Also, for example, machine learning models 725 and/or algorithms 720 may be located within an organization, such as a cybersecurity framework for an organization. In some embodiments, the training phase 705 of the one or more machine learning models 725 may be performed at a computing device that is different from a computing device where inference phase 710 is performed. Also, for example, input data 730 may be received at a first computing device, and provided to a second computing device that houses trained machine learning models 725. The second computing device may then apply machine learning models 725 to input data 730, and generate inference output 735. Subsequently, inference output 735 may be provided to the first computing device. Generally, one or more components of FIG. 7 may be available as a platform, as an application programming interface (API), an application-specific integrated circuit (ASIC), as a service (e.g., Software as a Service (SaaS), Machine Learning as a Service (MLaaS), Analytics as a Service (AnaaS), Platform as a Service (PaaS), Knowledge as a Service (KaaS), Network Defense as a Service (NDaaS)), and so forth.

Figure 8:
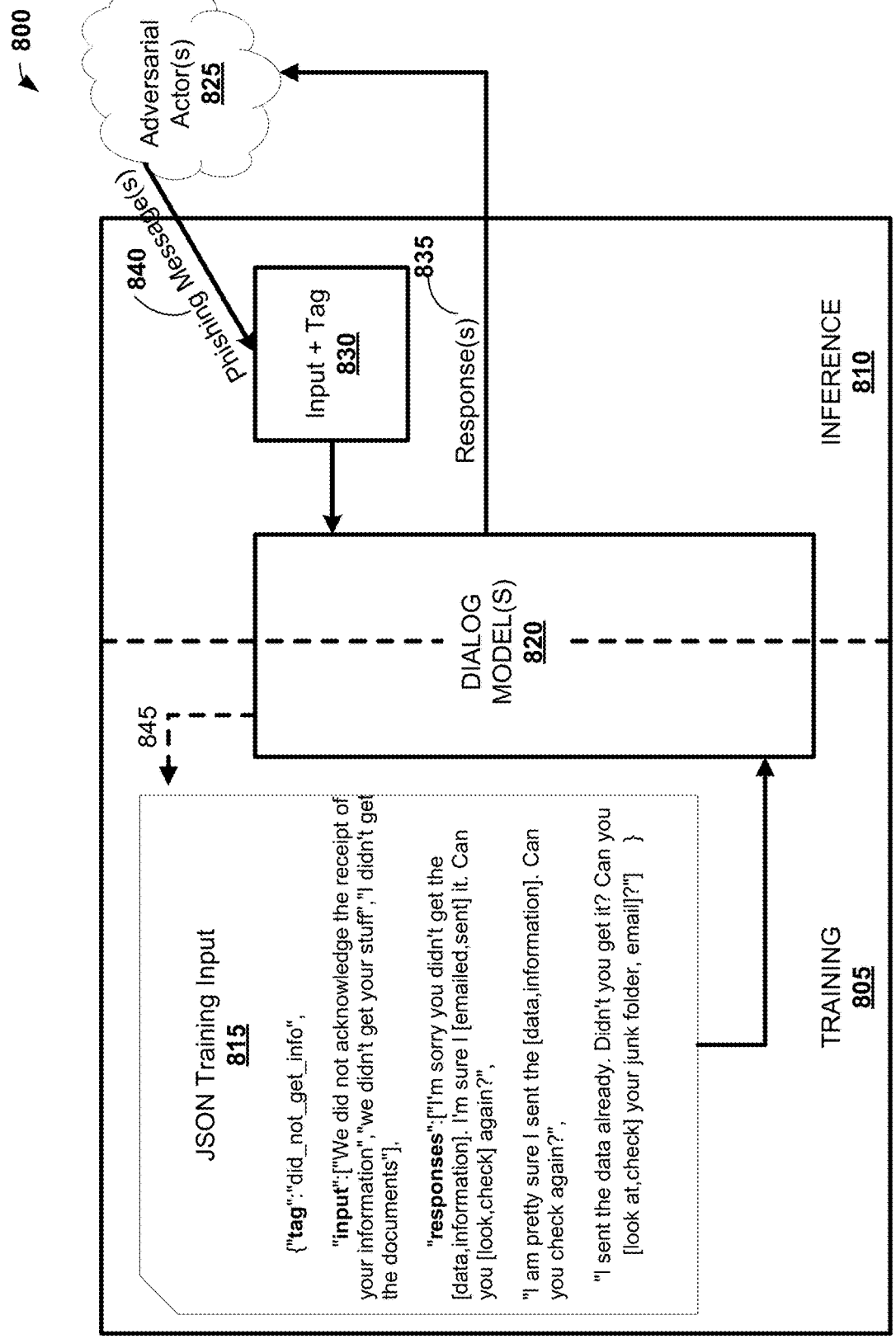
FIG. 8 depicts training and inference phases for an example dialog model, in accordance with example embodiments.

FIG. 8 depicts a diagram 800 illustrating training and inference phases for example dialog models 820, in accordance with example embodiments. Dialog models 820 can be configured to intelligently communicate via multiple modes of communication (e.g., email, short messaging system (SMS), instant messaging, a telephone call, and other forums such as social messaging forums like META®, TWITTER®, and so forth) in multiple rounds, while building rapport with an adversarial actor, and requesting information. Dialog models 820 may be NLP, NLU, NLG, or a combination thereof. Dialog models 820 may also be trained to extract information from the communication.

Conversation bots can be trained to semantically recognize words and/or phrases in an incoming message, and generate a response based on the detected words and/or phrases. As described herein, dialog models 820 may be based on a trained Semantic Text Similarity (STS) model to detect an intent from one or more messages and generate the responses to those messages based on the detected intent. For example, dialog models 820 may be trained to recognize whether a message includes a question or a statement, infer a mood, detect an urgency, deduce a sentiment, and so forth. For example, social and emotional intelligence features may be incorporated to respond with a different "tone" if an adversarial actor 825 becomes angry or pulls back from the conversation. Such features may include indicators based on latent attributes, message identifiers associated with a thematic label, sentiment analysis. In some embodiments, social and emotional intelligence features may be used to assemble a playbook of an adversarial actor, and/or a counterphishing dialog model designed to engage the adversarial actor. The features may include indicators of urgency, flattery, hostility, threat, profanity, and so forth. In some embodiments, common themes in messages at later rounds of SEA conversations may be detected. Such themes may be used in the ML models described herein.

As indicated, in the training phase 805, dialog models 820 may be trained based on training input (e.g., JSON training input 815) which may include a status identifier, an input phrase, and one or more responses. For example, a status identifier may be a phrase "did_not_get_info." An input phrase may be a phrase in an incoming message, such as, "we did not acknowledge the receipt of your information," or "we didn't get your stuff," or "I didn't get the documents," and so forth. The status identifier and the input phrase may be associated with one or more responses such as, for example, "I'm sorry you didn't get the [data, information]" or "I'm sure I [emailed, sent] it. Can you [look, check] again?" or "I am pretty sure I sent the [data, information]. Can you check again?" or "I sent the data already. Didn't you get it? Can you [look at, check] your junk folder, email]?", and so forth.

In some embodiments, the engaging in the deep dialog with the adversarial actor involves determining an intent in an incoming message from the adversarial actor during the deep dialog, wherein the determining of the intent is based on a trained Semantic Text Similarity (STS) model. Such embodiments also involve generating a response to the incoming message based on the determined intent. As described herein, dialog models 820 may be trained based on a message embedding with an 'input phrase' referenced by a 'status identifier'. In the inference phase 810, when phishing messages 840 are received from adversarial actors 825, the message may be analyzed at block 830 to extract a phrase and a status identifier. Dialog models 820 may apply STS to identify a semantic similarity to the trained input 815. In some embodiments, a similarity score to the phrase may be measured on a scale from 0 and 1. Based on the similarity score, a strength of the semantic similarity may be determined, and dialog models 820 may output a response 835. Similar techniques may be utilized to determine social and emotional intelligence to determine an optimal response. In some embodiments, selection of a response 835 may be a random choice among candidate responses.

As an example, phishing messages 840 may be processed to detect a phrase, "we didn't get your article" or "your information was missing." Dialog models 820 may determine that the phrase is semantically similar to the intent represented by a training input "did_not_get_info". Accordingly, dialog models 820 may generate a response, "I am pretty sure I sent the information. Can you check again?". Generally, a system trained to detect specific keywords and/or key phrases would likely not be able to respond intelligently to phishing messages 840. Feedback loop 845 may update training input 815 based on predictions by dialog models 820 during inference phase 810.

In some embodiments, dialog models 820 may utilize slot filling to add relevant information from databases to the response. For example, in a response, "My cell is %_cell_number," dialog models 820 may access an appropriate to retrieve the cell phone number to be "535-333-1212," and subsequently insert the retrieved number into the response, "My cell is 535-333-1212."

In some embodiments, dialog models 820 may utilize macros to allow multiple ways to modify the response. For example, the response "[I am, we are] going to [fly, drive] to the [conference, party, meeting, and celebration]" can output multiple responses: "I am going to fly to the conference," "We are going to drive to the meeting," "We are going to fly to the party," and so forth. In some embodiments, the responses can be modulated based on the ongoing conversation, historical information about an adversarial actor's preferences, an existing playbook, a gender, religion, or other characteristic of the adversarial actor, the intended target, or both. In some embodiments, the engaging in the deep dialog with the adversarial actor is performed by a dialog model, and wherein the dialog model is configured based on one or more of a type of adversarial actor, a type of target user, a type of enterprise organization, a mode of communication, a type of conversation, a language, or a known dialog interaction strategy of a known playbook. For example, a dialog model for a synthetic persona may be tailored based on one or more characteristics, including, but not limited to, a type of attacker, a type of target, a type of enterprise, a type of channel, a type of conversation (romantic, business, religious), a language, a playbook, and so forth.

In some embodiments, the engaging in the deep dialog with the adversarial actor is performed by a dialog model, the dialog model having been trained based on one or more of natural language processing (NLP), natural language understanding (NLU), or natural language grammar (NLG). For example, dialog models 820 may identify and/or extract information from the messages (e.g. names, organizations, dates, locations, addresses, and so forth) by using various forms of NLP, NLU, NLG, or regular expression (RegEx).

Some embodiments involve obtaining, from the deep dialog, the one or more attributes related to the adversarial actor. The engaging in the deep dialog involves dynamically adjusting, during each round of the electronic communication exchanges, a response to the adversarial actor based on obtaining an additional attribute. For example, dialog models 820 may (e.g., by utilizing known playbooks) ask for information in a particular order, and/or change a direction of the conversation if the adversarial actor 825 answers one way or another. For example, dialog models 820 may predict a response 835, such as, "Do you research Covid?" If the incoming phishing messages 840 from adversarial actor 825 is a "No," then dialog models 820 may generate a new response 835 that states, "Thank You," and dialog models 820 may exit the conversation. However, if the incoming phishing messages 840 from adversarial actor 825 is a "Yes," then dialog models 820 may continue the conversation and ask more questions based upon the playbook (e.g. the playbook's next directive may be "Ask for Phone" and dialog models 820 may generate a new response 835, such as, "Can I get your number to ask you more questions?."

Example Networking Environment

Figure 9:
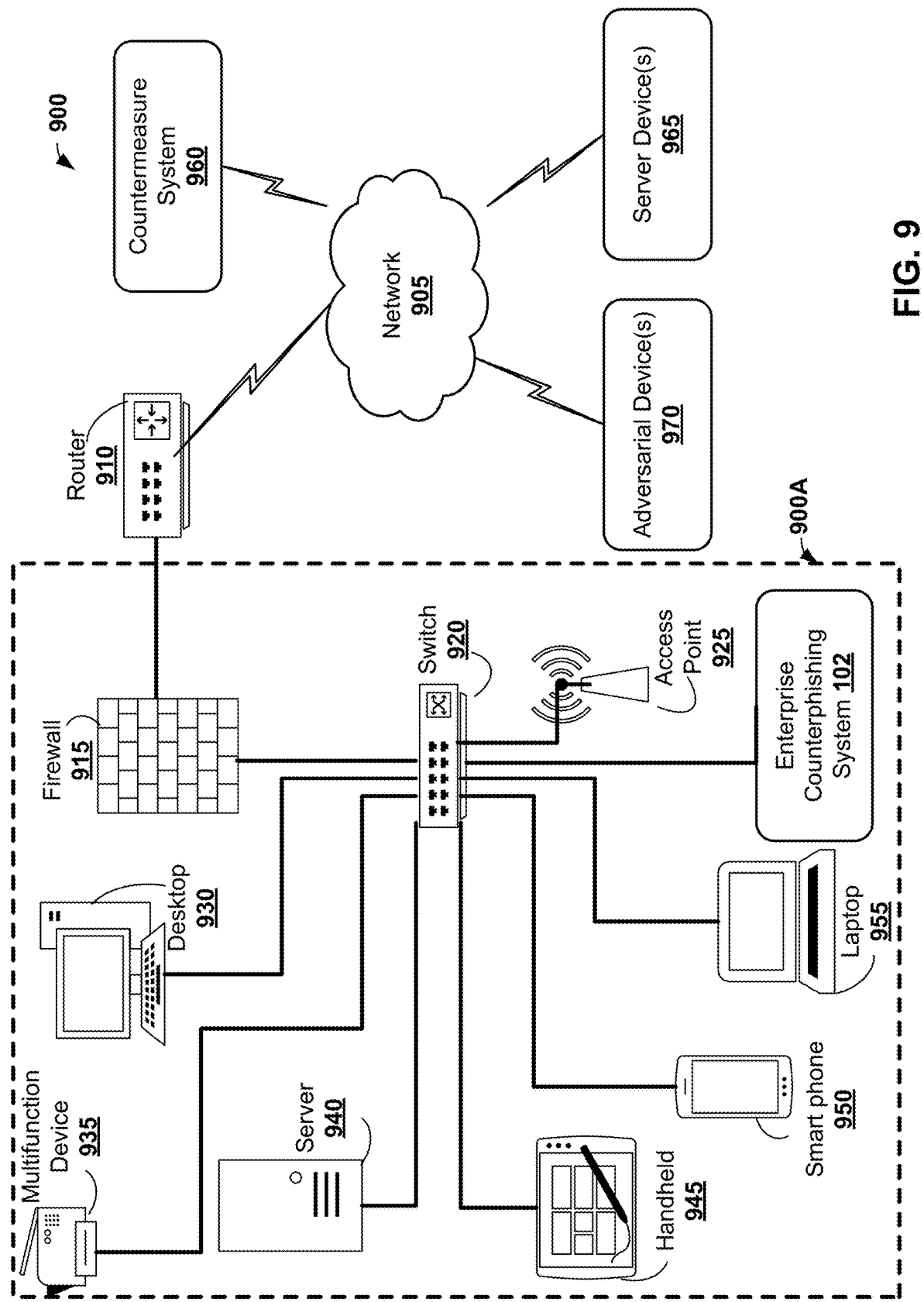
FIG. 9 depicts a network environment for a social engineering attack detection system, in accordance with example embodiments.

FIG. 9 depicts a network environment for a social engineering attack detection system, in accordance with example embodiments. Network environment 900 includes network 905, countermeasure system 960, server device(s) 965, and adversarial device(s) 970, that are configured to communicate, via network 905, with an enterprise system 900A that includes one or more devices such as a desktop 930, a multifunction device 935, a server 940, a handheld device 945, a smart phone 950, and/or a laptop 955.

Network 905 may correspond to a local area network (LAN), a wide area network (WAN), a WLAN, a WWAN, a corporate intranet, the public Internet, or any other type of network configured to provide a communications path between networked computing devices. Network 905 may also correspond to a combination of one or more LANs, WANs, corporate intranets, and/or the public Internet.

The network environment 900 may include tens, hundreds, or thousands of devices. In some examples, the one or more devices can be directly connected to network 905. Also, for example, network environment 900 may include tens, hundreds, or thousands of enterprise systems similar to 900A, corresponding to different organizations. In other examples, the devices can be indirectly connected to network 905 via router 910, firewall 915, network switch 920, and/or access point 925. In this example, router 910, firewall 915, network switch 920, and/or access point 925 can act as an associated computing device to pass electronic communications between the one or more devices and network 905. Although an example physical topology of network 905 is illustrated in FIG. 9, it is understood that network 905 may be associated with a logical topology for data flow between physical components of network 905.

Router 910 can be configured to transmit packets by processing routing information included in a packet (e.g., Internet protocol (IP) data from layer 3). The routing information can be processed via a routing table. Firewall 915 is a network device that can be configured to control network security and access rules. Network switch 920 can be a single switch or an array of switches. Network switch 920 is a network device that can be configured to connect various devices on a network, such as, for example, desktop 930, multifunction device 935, server 940, handheld device 945, smart phone 950, and/or laptop 955. Network switch 920 can use packet switching to receive and forward data between devices in a network. Access point 925 is a network device that can be configured to provide wireless access to various devices on the network.

Server device(s) 965 can be configured to perform one or more services, as requested by the one or more devices. For example, server device(s) 965 can provide content to the one or more devices. The content can include, but is not limited to, content available over the World Wide Web (WWW), content from a dedicated server, software (e.g., a messaging application, a social media platform, an electronic mail application, and so forth), images, audio, and/or video. The content can include confidential information. Although server 940 is shown as a single server, it can represent a plurality of servers, and/or a data center comprising a plurality of servers.

In some embodiments, countermeasure system 960 can be a monitoring and/or management device that monitors and/or manages communications received by devices in enterprise system 900A for potential attacks by an adversarial device 970. For example, a messaging application (e.g., an email application) may be installed in one or more devices (e.g., desktop 930, a multifunction device 935, a server 940, a handheld device 945, a smart phone 950, and/or a laptop 955), and server 940 may communicate with server device(s) 965 to provide the email messaging service. For example, enterprise system 900A may include enterprise counterphishing system 102. After identifying one or more email messages as potentially susceptible to attack from an adversarial device 970, enterprise counterphishing system 102 may provide the emails to countermeasure system 960.

Countermeasure system 960 may perform one or more functions described with reference to FIG. 1A. For example, countermeasure system 960 may initiate a conversation with adversarial device 970 by deploying one or more synthetic persona, generate forensic signatures, detect playbook models, generate notifications and/or alerts, and update a feature detection system within enterprise system 900A. In some embodiments, countermeasure system 960 may deploy one or more synthetic persona within an organization. For example, when a target user within an organization receives a malicious message from an adversarial actor, countermeasure system 960 may generate a synthetic persona, for example, to emulate the target user, and engage the adversarial actor in a conversation. In some embodiments, countermeasure system 960 may include a mapping (e.g., an IMAP) of a message inbox to monitor, manage, and/or respond to cyber security threats.

In some embodiments, countermeasure system 960 may be located within a computing environment of an enterprise system, such as, for example, enterprise counterphishing system 102. For example, countermeasure system 960 may be a component of an organization's threat detection infrastructure.

In some embodiments, countermeasure system 960 may be a distributed system with various components in one or more organizations that may be monitoring their networks, applications, and so forth. For example, one or more of the feature detection system (e.g., feature detection system 142), message classifier (e.g., message classifier 108), and so forth may be a component of an enterprise organization's network security architecture (e.g., enterprise counterphishing system 102). Also, for example, countermeasure system 960 may be a distributed system including various components such as an alert system, a notification system, a message archival system, a message retrieval system, various components of machine learning models, and so forth. In some embodiments, countermeasure system 960 may include a central server (e.g., a cloud server) that manages the various components of countermeasure system 960.

In some embodiments, countermeasure system 960 may be distributed as a front-end component and a back-end component. For example, a dialog manager (e.g., ensemble dialog manager 112) may be available as a front-end component. For example, a network administrator may be able to view and interact with (e.g., on a mobile device, a mobile application, and so forth) the dialog manager to identify and locate threats. Also, for example, machine learning based processing engine 134 may be a part of a back-end component.

In some embodiments, countermeasure system 960 may be in communication with other systems or organizations that are involved in threat protection, cybersecurity, cyber defense, and so forth. For example, countermeasure system 960 may obtain information about real and/or perceived hostile activities from various organizations, and may update and/or train its models based on that. For example, countermeasure system 960 may receive data indicating an increase in a phishing activity originating in a certain geographic region, and may update a feature detection system (e.g., feature detection system 142), and/or one or more machine learning models accordingly.

Countermeasure system 960, or one or more components thereof, may be provided as a service, such as for example, Software as a Service (SaaS), Machine Learning as a Service (MLaaS), Analytics as a Service (AnaaS), Platform as a Service (PaaS), Knowledge as a Service (KaaS), and Network Defense as a Service (NDaaS), among others.

Example Computing Environment

Figure 10:
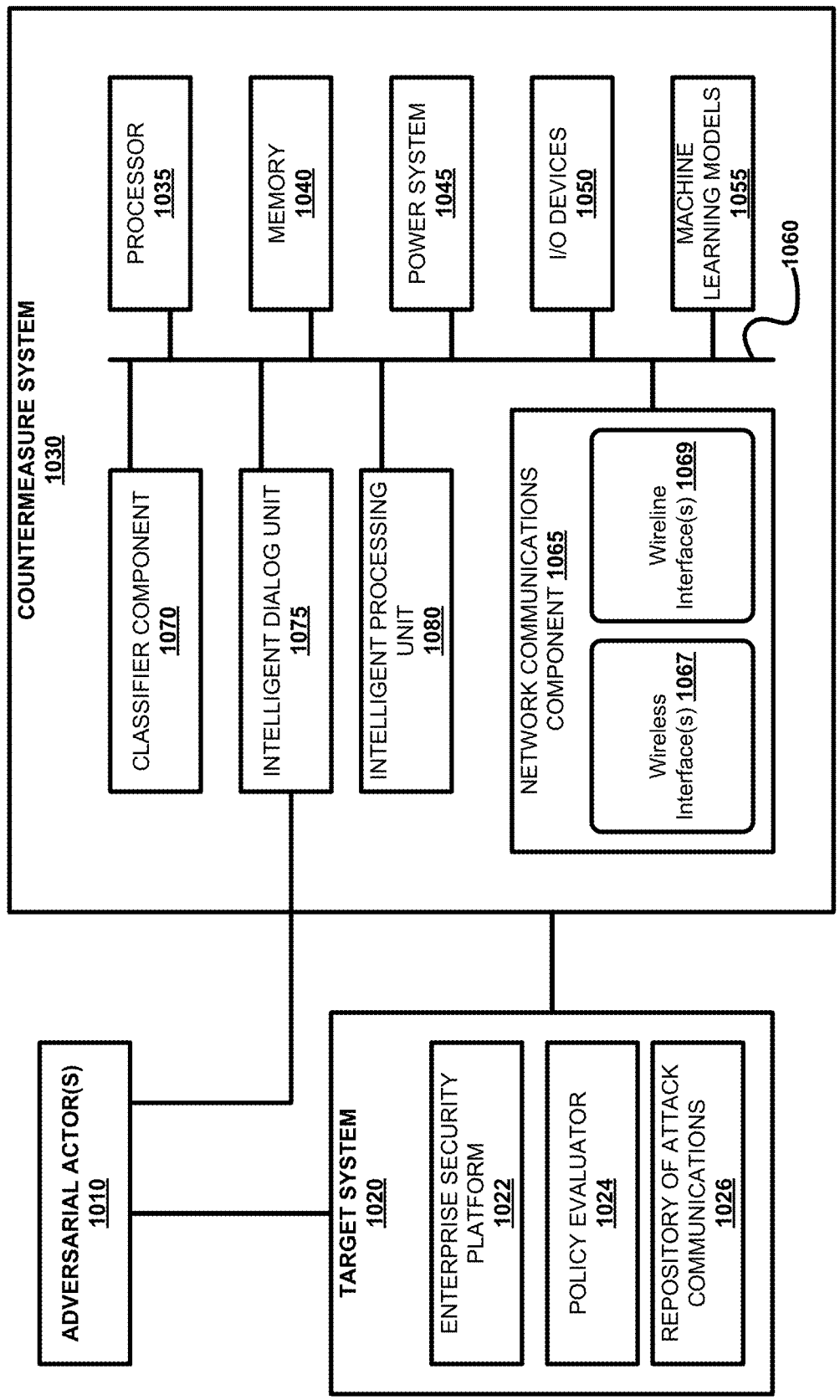
FIG. 10 is a block diagram of an example computing environment for a social engineering attack detection system, in accordance with example embodiments.

FIG. 10 is a block diagram of an example computing environment 1000 for a social engineering attack detection system, in accordance with example embodiments. In particular, computing environment 1000 shown in FIG. 10 can be configured to perform at least one function of and/or related to social engineering attack detection.

Computing environment 1000 may include adversarial actor(s) 1010 (likely to be a hostile actor that send phishing emails and other malicious communications), target system 1020 (such as enterprise system 900A of FIG. 9 where one or more users are a target of messages from adversarial actor(s) 1010), and countermeasure system 1030 that performs social engineering attack detection. Countermeasure system 1030 can include a one or more processors 1035, memory 1040, power system 1045, input/output devices 1050, and network communications component 1065, all of which may be linked together via a system bus, network, or other connection mechanism 1060. Countermeasure system 1030 can be countermeasure system 960 of FIG. 9, and/or comprise one or more of the components described with reference to FIG. 1A.

For example, countermeasure system 1030 may include a classifier component 1070, which may perform operations similar to message classifier 108 of FIG. 1A. Also, for example, countermeasure system 1030 may include an intelligent dialog unit 1075, which may perform operations similar to ensemble dialog manager 112 of FIG. 1A. As another example, countermeasure system 1030 may include an intelligent processing unit 1080, which may perform operations similar to machine learning based processing engine 134 of FIG. 1A. Countermeasure system 1030 also includes machine learning model(s) 1055, which may perform operations similar to machine learning models described with reference to FIGS. 5 and 6.

One or more processors 1035 can include one or more general purpose processors, and/or one or more special purpose processors (e.g., digital signal processors, graphics processing units (GPUs), application specific integrated circuits, etc.). One or more processors 1035 can be configured to execute computer-readable instructions that are contained in memory 1040 and/or other instructions as described herein.

Memory 1040 can include one or more non-transitory computer-readable storage media that can be read and/or accessed by at least one of one or more processors 1035. The one or more computer-readable storage media can include volatile and/or non-volatile storage components, such as optical, magnetic, organic or other memory or disc storage, which can be integrated in whole or in part with at least one of one or more processors 1035. In some examples, memory 1040 can be implemented using a single physical device (e.g., one optical, magnetic, organic or other memory or disc storage unit), while in other examples, memory 1040 can be implemented using two or more physical devices.

Power system 1045 can include one or more batteries and/or one or more external power interfaces for providing electrical power to countermeasure system 1030. One or more external power interfaces of power system 1045 can include one or more wired-power interfaces, such as a USB cable and/or a power cord, that enable wired electrical power connections to one or more power supplies that are external to countermeasure system 1030.

Input/output devices 1050 may include storage devices, a receiver, a transmitter, a speaker, a display, an image capturing component, an audio recording component, a user input device (e.g., a keyboard, a mouse, a microphone), and so forth. Although not shown in FIG. 10, one or more of I/O devices 1050 may be a device external to countermeasure system 1030. Such an external device may communicate with countermeasure system 1030 via a wired or wireless connection, and such communication may be facilitated by an I/O interface of countermeasure system 1030. In some embodiments, I/O devices 1050 may include devices that display a dialog manager, such as those described with reference to FIGS. 2, 3, and 4.

Network communications component 1065 can include one or more devices that provide one or more wireless interfaces 1067 and/or one or more wireline interfaces 1069 that are configurable to communicate via a network. Wireless interface(s) 1067 can include one or more wireless transmitters, receivers, and/or transceivers, such as a Bluetooth™ transceiver, a Wi-Fi™ transceiver, an LTE™ transceiver, and/or other type of wireless transceiver configurable to communicate via a wireless network, such as, for example, a brain/neural interface. Wireline interface(s) 1069 can include one or more wireline transmitters, receivers, and/or transceivers, such as an Ethernet transceiver, a Universal Serial Bus (USB) transceiver, or similar transceiver configurable to communicate via a physical connection to a wireline network.

Network communications component 1065 can be configured to provide reliable, secured, and/or authenticated communications between various components. For each communication described herein, information for facilitating reliable communications (e.g., guaranteed message delivery) can be provided, perhaps as part of a message header and/or footer (e.g., packet/message sequencing information, encapsulation headers and/or footers, size/time information, and transmission verification information). Communications can be made secure (e.g., be encoded or encrypted) and/or decrypted/decoded using one or more cryptographic protocols and/or algorithms, such as, but not limited to, a secure sockets protocol such as Secure Sockets Layer (SSL), and/or Transport Layer Security (TLS).

Computing environment 1000 can include target system 1020. In some implementations, target system 1020 can include enterprise security platform 1022, policy evaluator 1024, and/or repository 1026. Enterprise security platform 1022 may perform operations similar to enterprise security platform 104 of FIG. 1A.

Policy evaluator 1024 can be configured to evaluate and/or implement corporate policies related to enterprise security platform 1022. In some embodiments, policy evaluator 1024 may implement policies based on feedback from countermeasure system 1030.

Although enterprise security platform 1022 and policy evaluator 1024 are shown as distinct components of target system 1020, this is for illustrative purposes only. In some embodiments, enterprise security platform 1022 and policy evaluator 1024 can be a single component. In some implementations, enterprise security platform 1022 and policy evaluator 1024 can be housed in two separate physical devices.

In some embodiments, target system 1020 can include repository 1026. Repository 1026 can be configured to include communications that have been filtered by enterprise security platform 1022 as potential targets of phishing or other malicious attacks from adversarial actor(s) 1010.

Example Method of Operation

Figure 11:
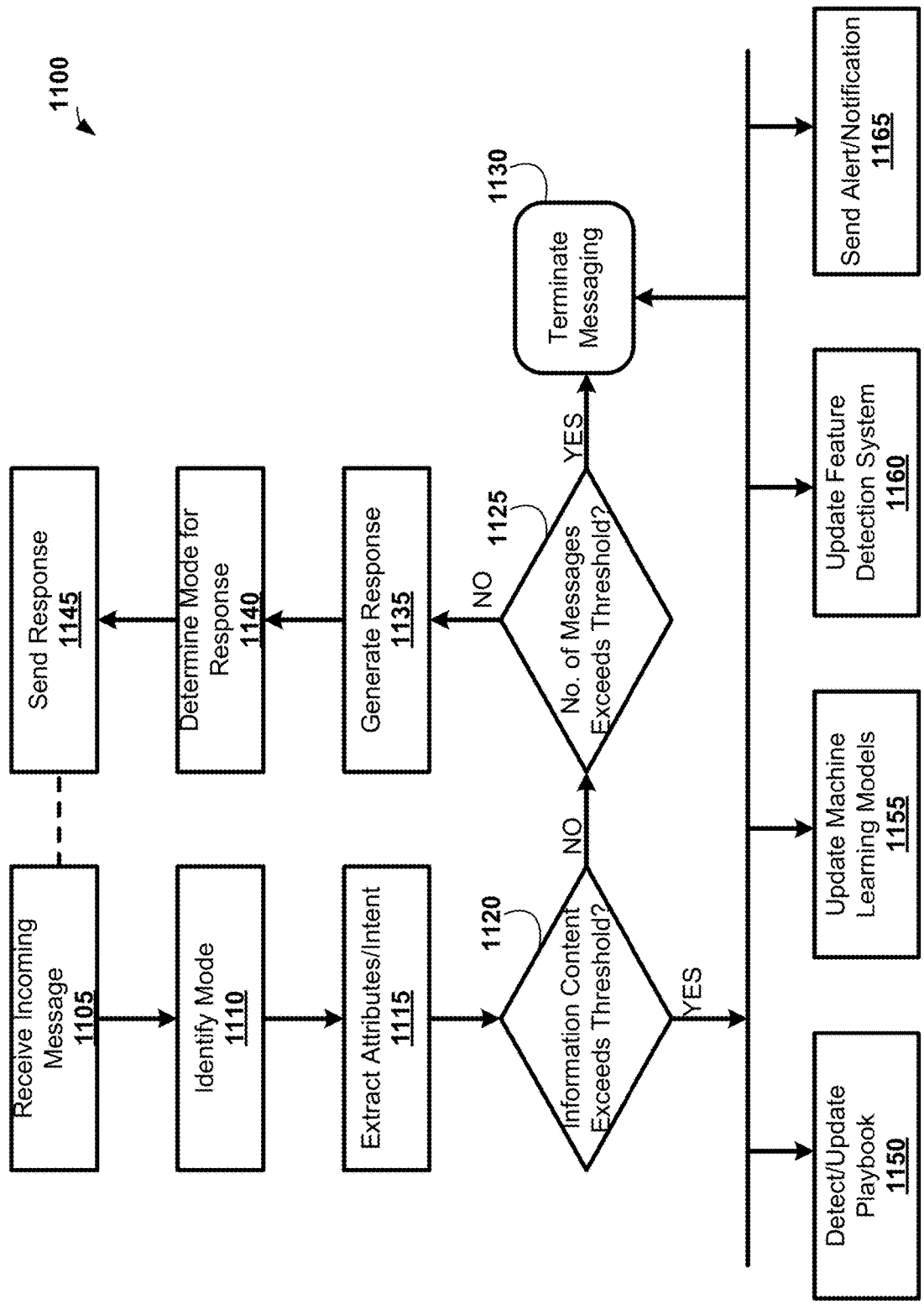
FIG. 11 illustrates a flowchart, in accordance with example embodiments.

FIG. 11 illustrates a flowchart, in accordance with example embodiments. Method 1100 may include various blocks or steps. The blocks or steps may be carried out individually or in combination. The blocks or steps may be carried out in any order and/or in series or in parallel. Further, blocks or steps may be omitted or added to method 1100.

The blocks of method 1100 may be carried out by various elements of countermeasure system 960 of FIG. 9, and/or countermeasure system 1030 of FIG. 10.

Block 1105 involves receiving incoming messages, such as, for example, phishing messages.

Some embodiments involve detecting an initial mode of communication associated with the electronic communication. Block 1110 involves identifying a mode for the incoming messages, such as, for example, whether it is an electronic mail communication, an instant messaging communication, a short messaging system (SMS) message, a telephone call, an interaction over a social media platform, and so forth. Some embodiments involve determining, during a first round of the two or more rounds of electronic communication exchanges, a change from the initial mode of communication to another mode of communication. For example, the adversarial actor may switch from an email to a SMS message. Such embodiments involve pivoting to the other mode of communication in a response to the adversarial actor during s second round subsequent to the first round. For example, responsive to the switch by the adversarial actor from the email to the SMS message, the dialog model (or the synthetic bot) may be configured to switch the responses from the email to the SMS message.

Block 1115 involves extracting attributes and/or inferring intent from the incoming messages. For example, one or more aspects of these functions may be performed by dialog models 820 of FIG. 8. Some embodiments involve determining a length and type of the deep dialog in order to obtain one or more attributes related to the adversarial actor. For example, some attributes may entail several rounds of conversation until an information threshold is reached.

Block 1120 involves determining whether a collected information content exceeds an information threshold. For example, the goal may be to reverse engineer a playbook model deployed by an adversarial actor. Accordingly, at block 1120, it may be determined whether there is sufficient information to reverse engineer the playbook model. As another example, the goal may be to extract sufficient forensics signature related to the adversarial actor. Accordingly, at block 1120, it may be determined whether there is sufficient forensics signature related to the adversarial actor. Also, for example, the goal may be to identify the adversarial actor. Accordingly, at block 1120, it may be determined whether there is sufficient information to identify the adversarial actor.

In some embodiments, the determining of the length and the type of the deep dialog involves determining whether an attribute count of the one or more attributes exceeds an attribute threshold. Generally, a goal may be to detect attributes of an adversarial actor, such as an exposed email, a unique name, domain name, a telephone number, and so forth. The system described herein attempts to pivot a conversation to obtain the attributes. For example, instead of waiting for an adversarial actor to reveal the attributes, the systems described herein may seek out attributes by engaging the adversarial actor. In some embodiments, the system described herein may thwart an adversarial actor's known playbook. In some embodiments, the system described herein may design a counterphishing dialog model to seek and extract attributes from a conversation.

Some embodiments involve terminating the deep dialog upon a determination that the attribute count exceeds the attribute threshold. For example, stop logic may be used to determine when a goal has been achieved, and/or a sufficient number of attributes have been detected that may further the goals of the SEA detection system. For example, a dialog engine may be configured to maintain a level of information content, design the conversation to entice the adversarial actor to reveal unknown attributes, and/or confirm accuracy of a known attribute. In some embodiments, a dialog engine may be configured to terminate the conversation when an acquired information content exceeds a threshold (e.g., 8 out of 10 attributes are received).

In some embodiments, attributes may be associated with confidence levels, and the information content may be weighted based on the associated confidence levels. For example, the information content may be a quantitative measurement of a sum of the individual confidence levels for the extracted attributes. In some embodiments, a detected playbook may be associated with a confidence level, and the information content may be based on the confidence level associated with the detected playbook. As described herein, message classifier 108, EDM 112, dialog engines 122, ML based processing engine 134, feature detection system 142, and/or other components of SEA detection system 100A may be dynamically interlinked, and/or updated in substantial real-time.

Upon a determination that the collected information content does not exceed the information threshold, the process may move to block 1125. In some embodiments, the determining of the length and the type of the deep dialog involves determining whether a message count of the two or more rounds of electronic communication exchanges exceeds a message threshold. At block 1125, it may be determined whether the number of messages in the communication chain exceeds a numerical threshold. Other thresholds may be utilized as well. For example, a threshold amount of time may have passed since the last message from the adversarial actor. As another example, a time duration for the entire conversation chain may exceed a time threshold.

Some embodiments involve terminating the deep dialog upon a determination that the message count exceeds the message threshold. For example, upon a determination that the number of messages in the communication chain exceeds a numerical threshold (or the time threshold), the process may move to block 1130 where the communication exchange with the adversarial actor is terminated.

Upon a determination that the number of messages in the communication chain does not exceed a numerical threshold (or the time threshold), the process may move to block 1135. Block 1135 involves generating a response to the incoming message. One or more aspects of these functions may be performed by dialog models 820 of FIG. 8.

Block 1140 involves determining a mode for the response. For example, the incoming message may be an email message and the generated response may be sent as an email as well. In some embodiments, the generated response may be sent via an instant messaging application. Additional and/or alternative modes of communication may be used.

Block 1145 involves sending the generated response to the adversarial actor based on the determined mode. In some aspects, the adversarial actor may respond to the generated message, thereby adding to the chain of communications. Accordingly, the process may begin at block 1105 with the new incoming message.

Upon a determination that the collected information content exceeds the information threshold, one or more operations may be performed. For example, the process may move to block 1130 where the communication exchange with the adversarial actor is terminated.

In some embodiments, the process may move to block 1150 where a playbook is detected and/or updated. In some embodiments, the process may move to block 1155 where one or more machine learning models (e.g., message classifier 108, dialog engine 122, machine learning model(s) 725, dialog model(s) 820, and so forth) may be updated. In some embodiments, the process may move to block 1160 where a feature detection system (e.g., feature detection system 142 of FIG. 1A) may be updated (e.g., based on forensic signatures 136, playbook models 138, conversation analyzer 140, and so forth). In some embodiments, the process may move to block 1165 where an alert or notification may be generated to be sent to a user (e.g., an enterprise user who received the phishing email) who is identified as a target of the phishing attack by the adversarial actor.

Figure 12:
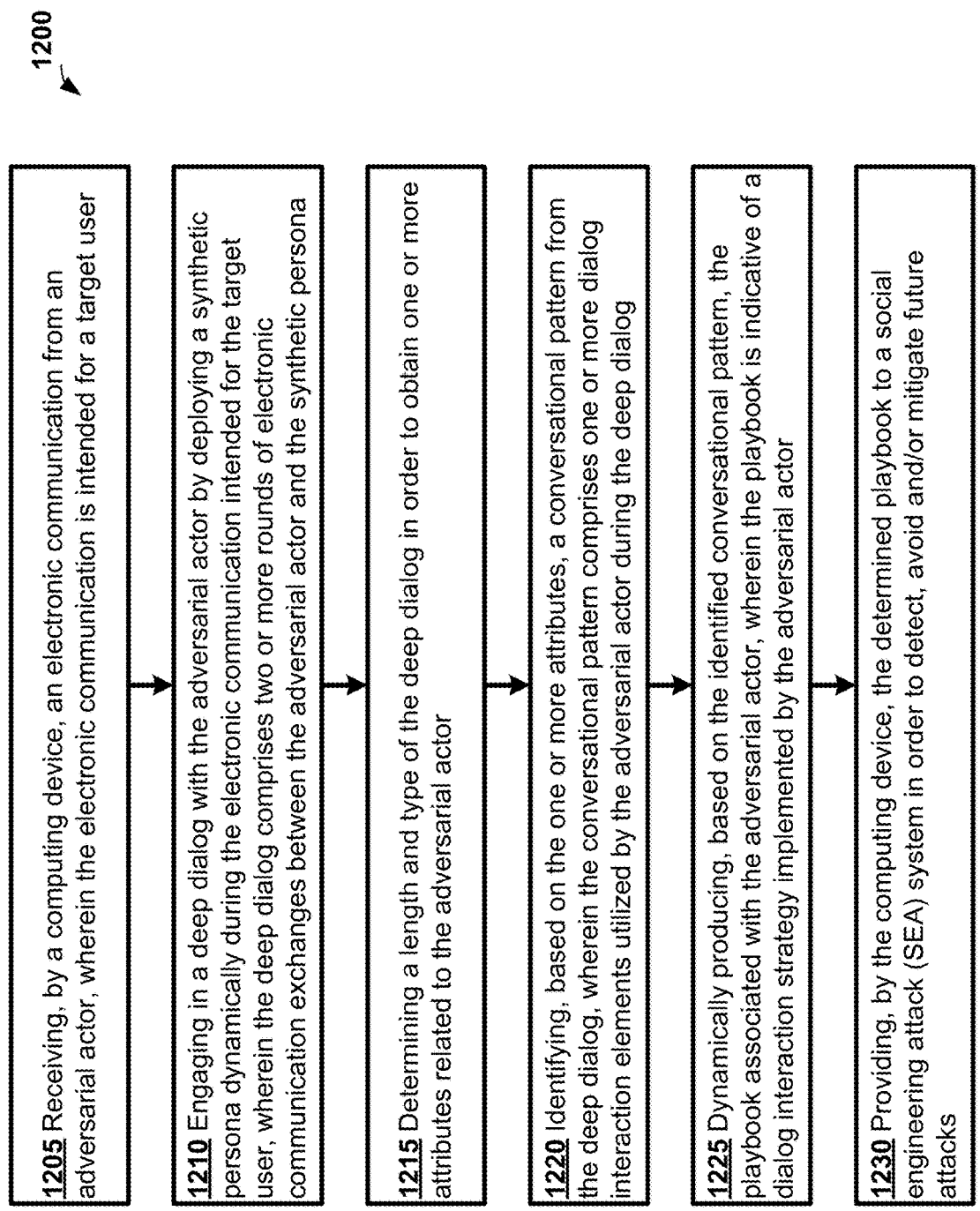
FIG. 12 illustrates a flowchart, in accordance with example embodiments.

FIG. 12 illustrates a flowchart, in accordance with example embodiments. Method 1200 may include various blocks or steps. The blocks or steps may be carried out individually or in combination. The blocks or steps may be carried out in any order and/or in series or in parallel. Further, blocks or steps may be omitted or added to method 1200.

The blocks of method 1200 may be carried out by various elements of countermeasure system 960 of FIG. 9, and/or countermeasure system 1030 of FIG. 10.

Block 1205 involves receiving, by a computing device, an electronic communication from an adversarial actor, wherein the electronic communication is intended for a target user.

Block 1210 involves engaging in a deep dialog with the adversarial actor by deploying a synthetic persona dynamically during the electronic communication intended for the target user, wherein the deep dialog comprises two or more rounds of electronic communication exchanges between the adversarial actor and the synthetic persona.

Block 1215 involves determining a length and type of the deep dialog in order to obtain one or more attributes related to the adversarial actor.

Block 1220 involves identifying, based on the one or more attributes, a conversational pattern from the deep dialog, wherein the conversational pattern comprises one or more dialog interaction elements utilized by the adversarial actor during the deep dialog.

Block 1225 involves dynamically producing, based on the identified conversational pattern, a playbook associated with the adversarial actor, wherein the playbook is indicative of a dialog interaction strategy implemented by the adversarial actor.

Block 1230 involves providing, by the computing device, the playbook to a social engineering attack (SEA) system in order to detect, avoid and/or mitigate future attacks.

Some embodiments involve detecting, from the deep dialog, at least one respective dialog interaction element associated with a respective incoming message from the adversarial actor during a respective round of the electronic communication exchanges, and wherein the identifying of the conversational pattern comprises associating an occurrence of the at least one respective dialog interaction element with a conversation depth of the respective round.

In some embodiments the engaging in the deep dialog with the adversarial actor is performed by a dialog model, the dialog model having been trained based on one or more of natural language processing (NLP), natural language understanding (NLU), or natural language grammar (NLG).

In some embodiments the engaging in the deep dialog with the adversarial actor is performed by a dialog model, and wherein the dialog model is configured based on one or more of a type of adversarial actor, a type of target user, a type of enterprise organization, a mode of communication, a type of conversation, a language, or a known dialog interaction strategy of a known playbook.

In some embodiments the engaging in the deep dialog involves generating, by the computing device, an outgoing electronic communication responsive to an incoming electronic communication from the adversarial actor. Such embodiments also involve sending, by the computing device, the outgoing electronic communication to the adversarial actor.

In some embodiments the engaging in the deep dialog with the adversarial actor involves determining an intent in an incoming message from the adversarial actor during the deep dialog, wherein the determining of the intent is based on a trained Semantic Text Similarity (STS) model. Such embodiments also involve generating a response to the incoming message based on the determined intent.

In some embodiments the engaging in the deep dialog with the adversarial actor involves utilizing the synthetic persona to impersonate the target user during the deep dialog with the adversarial actor.

In some embodiments the engaging in the deep dialog with the adversarial actor involves utilizing the synthetic persona to pivot the electronic communication exchanges from the target user to the synthetic persona during the deep dialog with the adversarial actor.

Some embodiments involve determining that the dialog interaction strategy of the playbook matches a known dialog interaction strategy associated with a known adversarial actor. Such embodiments involve identifying the adversarial actor as the known adversarial actor.

Some embodiments involve retrieving, from an electronic communications repository, a plurality of electronic communications that have been received within a prior time interval. Such embodiments involve identifying, based on the playbook, a past attack or an ongoing attack by the adversarial actor.

Some embodiments involve engaging, by using a plurality of counterphishing dialog models, in a plurality of deep dialogs with another adversarial actor. Such embodiments also involve determining, based on the plurality of deep dialogs, a plurality of dialog interaction elements. Such embodiments additionally involve identifying, based on an occurrence of the plurality of dialog interaction elements in the plurality of deep dialogs, an underlying conversational pattern associated with the other adversarial actor. Such embodiments also involve determining, based on the underlying conversational pattern, another playbook associated with the other adversarial actor.

Some embodiments involve applying a machine learning (ML) based message classifier to determine whether the electronic communication is part of a social engineering attack (SEA), wherein the applying of the ML based message classifier comprises applying one or more heuristics, one or more thematic labels, or a text classification.

In some embodiments, the determining of the length and the type of the deep dialog involves determining whether a message count of the two or more rounds of electronic communication exchanges exceeds a message threshold. Such embodiments also involve terminating the deep dialog upon a determination that the message count exceeds the message threshold.

In some embodiments, the determining of the length and the type of the deep dialog involves obtaining, from the deep dialog, the one or more attributes related to the adversarial actor. The engaging in the deep dialog involves dynamically adjusting, during each round of the electronic communication exchanges, a response to the adversarial actor based on extracting an additional attribute.

In some embodiments, the determining of the length and the type of the deep dialog involves determining whether an attribute count of the one or more attributes exceeds an attribute threshold. Such embodiments also involve terminating the deep dialog upon a determination that the attribute count exceeds the attribute threshold.

Some embodiments involve determining, by the computing device and based on the deep dialog, a forensic signature associated with the adversarial actor. The determining of the playbook is based on the forensic signature. The forensic signature may include one or more of a domain name, an electronic mail address, a social media account, a telephone number, an internet protocol (IP) address.

In some embodiments, the engaging in the deep dialog with the adversarial actor involves detecting an initial mode of communication associated with the electronic communication. Such embodiments also involve determining, during a first round of the two or more rounds of electronic communication exchanges, a change from the initial mode of communication to another mode of communication. Such embodiments additionally involve pivoting to the other mode of communication in a response to the adversarial actor during s second round subsequent to the first round.

In some embodiments, the engaging in the deep dialog with the adversarial actor is performed by a dialog model, and the method involves determining a rate of engagement associated with the dialog model, wherein the rate of engagement is indicative of a success rate of the dialog model in the engaging in the deep dialog with the adversarial actor. A future deployment of the dialog model is based on the rate of engagement.

In some embodiments, the one or more dialog interaction elements includes a flattery, an urgency, a threat, use of abusive language, issuance of an ultimatum, a payment then reward strategy, presenting a financial opportunity, providing an anonymous contact point, a personal protected information (PPI) request, a payment stipulation, a recipient recrimination, an alternate contact modality, or an indication of waiting for a response.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information and/or comparison of signals can correspond to circuitry that can be configured to perform the specific logical functions of a herein-described method or technique. Alternatively or additionally, a step or block that represents a processing of information and/or comparison of signals can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A computer-implemented method of determining an adversarial attack playbook associated with an adversarial actor, comprising:
    receiving, by a computing device, an electronic communication from the adversarial actor, wherein the electronic communication is intended for a target user;
    engaging in a deep dialog with the adversarial actor by deploying a synthetic persona dynamically during the electronic communication intended for the target user, wherein the deep dialog comprises two or more rounds of electronic communication exchanges between the adversarial actor and the synthetic persona;
    determining a length and type of the deep dialog in order to obtain one or more attributes related to the adversarial actor;
    identifying, based on the one or more attributes, a conversational pattern from the deep dialog, wherein the conversational pattern comprises a conversation depth of a given round of the two or more rounds of the deep dialog, and respective class labels corresponding to attributes that appear in the given round;
    dynamically producing, based on the identified conversational pattern, the playbook associated with the adversarial actor, wherein the playbook is indicative of a dialog interaction strategy implemented by the adversarial actor; and
    providing, by the computing device, the playbook to a social engineering attack (SEA) system in order to detect, avoid and/or mitigate future attacks.

2. The computer-implemented method of claim 1, further comprising:
    detecting, from the deep dialog, at least one respective dialog interaction element associated with a respective incoming message from the adversarial actor during a respective round of the electronic communication exchanges, and
    wherein the identifying of the conversational pattern comprises associating an occurrence of the at least one respective dialog interaction element with the conversation depth of the respective round.

3. The computer-implemented method of claim 2, wherein the one or more dialog interaction elements comprises a flattery, an urgency, a threat, use of abusive language, issuance of an ultimatum, a payment then reward strategy, presenting a financial opportunity, providing an anonymous contact point, a personal protected information (PPI) request, a payment stipulation, a recipient recrimination, an alternate contact modality, or an indication of waiting for a response.

4. The computer-implemented method of claim 1, wherein the engaging in the deep dialog with the adversarial actor is performed by a dialog model, the dialog model having been trained based on one or more of natural language processing (NLP), natural language understanding (NLU), or natural language grammar (NLG).

5. The computer-implemented method of claim 1, wherein the engaging in the deep dialog with the adversarial actor is performed by a dialog model, and wherein the dialog model is configured based on one or more of a type of adversarial actor, a type of target user, a type of enterprise organization, a mode of communication, a type of conversation, a language, or a known dialog interaction strategy of a known playbook.

6. The computer-implemented method of claim 1, wherein the engaging in the deep dialog with the adversarial actor further comprises:
    determining an intent in an incoming message from the adversarial actor during the deep dialog, wherein the determining of the intent is based on a trained Semantic Text Similarity (STS) model; and
    generating a response to the incoming message based on the determined intent.

7. The computer-implemented method of claim 1, wherein the engaging in the deep dialog with the adversarial actor further comprises:
    utilizing the synthetic persona to impersonate the target user during the deep dialog with the adversarial actor.

8. The computer-implemented method of claim 1, wherein the engaging in the deep dialog with the adversarial actor further comprises:
    utilizing the synthetic persona to pivot the electronic communication exchanges from the target user to the synthetic persona during the deep dialog with the adversarial actor.

9. The computer-implemented method of claim 1, further comprising:
    determining that the dialog interaction strategy of the playbook matches a known dialog interaction strategy associated with a known adversarial actor; and
    identifying the adversarial actor as the known adversarial actor.

10. The computer-implemented method of claim 1, further comprising:
    retrieving, from an electronic communications repository, a plurality of electronic communications that have been received within a prior time interval; and
    identifying, based on the playbook, a past attack or an ongoing attack by the adversarial actor.

11. The computer-implemented method of claim 1, further comprising:
    engaging, by using a plurality of counterphishing dialog models, in a plurality of deep dialogs with another adversarial actor;
    determining, based on the plurality of deep dialogs, a plurality of dialog interaction elements;
    identifying, based on an occurrence of the plurality of dialog interaction elements in the plurality of deep dialogs, an underlying conversational pattern associated with the other adversarial actor; and
    determining, based on the underlying conversational pattern, another playbook associated with the other adversarial actor.

12. The computer-implemented method of claim 1, further comprising:
    applying a machine learning (ML) based message classifier to determine whether the electronic communication is part of a social engineering attack (SEA), wherein the applying of the ML based message classifier comprises applying one or more heuristics, one or more thematic labels, or a text classification.

13. The computer-implemented method of claim 1, wherein the determining of the length and the type of the deep dialog further comprises:
   determining whether a message count of the two or more rounds of electronic communication exchanges exceeds a message threshold; and
   terminating the deep dialog upon a determination that the message count exceeds the message threshold.

14. The computer-implemented method of claim 1, wherein the determining of the length and the type of the deep dialog further comprises:
   obtaining, from the deep dialog, the one or more attributes related to the adversarial actor,
   wherein the engaging in the deep dialog comprises dynamically adjusting, during each round of the electronic communication exchanges, a response to the adversarial actor in order to extract an additional attribute.

15. The computer-implemented method of claim 1, wherein the determining of the length and the type of the deep dialog further comprises:
   determining whether an attribute count of the one or more attributes exceeds an attribute threshold; and
   terminating the deep dialog upon a determination that the attribute count exceeds the attribute threshold.

16. The computer-implemented method of claim 1, further comprising:
   determining, by the computing device and based on the deep dialog, a forensic signature associated with the adversarial actor, and
   wherein the determining of the playbook is based on the forensic signature.

17. The computer-implemented method of claim 1, wherein the engaging in the deep dialog with the adversarial actor further comprises:
   detecting an initial mode of communication associated with the electronic communication;
   determining, during a first round of the two or more rounds of electronic communication exchanges, a change from the initial mode of communication to another mode of communication; and
   pivoting to the other mode of communication in a response to the adversarial actor during a second round subsequent to the first round.

18. The computer-implemented method of claim 1, wherein the engaging in the deep dialog with the adversarial actor is performed by a dialog model, and the method further comprises:
   determining a rate of engagement associated with the dialog model, wherein the rate of engagement is indicative of a success rate of the dialog model in the engaging in the deep dialog with the adversarial actor, and
   wherein a future deployment of the dialog model is based on the rate of engagement.

19. The computer-implemented method of claim 1, further comprising:
   applying a machine learning (ML) based message classifier to classify the one or more attributes into a plurality of class labels.

20. A system for determining an adversarial attack playbook associated with an adversarial actor, comprising:
   a dialog manager configured to engage in a deep dialog with the adversarial actor;
   a counterphish elicitation system configured to extract data from the deep dialog;
   one or more processors; and
   data storage, wherein the data storage has stored thereon computer-executable instructions that, when executed by the one or more processors, cause a computing device to perform operations comprising:
      receiving an electronic communication from the adversarial actor, wherein the electronic communication is intended for a target user;
      engaging, by the dialog manager, in a deep dialog with the adversarial actor by deploying a synthetic persona dynamically during the electronic communication intended for the target user, wherein the deep dialog comprises two or more rounds of electronic communication exchanges between the adversarial actor and the synthetic persona;
      determining, by the dialog manager, a length and type of the deep dialog in order to obtain one or more attributes related to the adversarial actor;
      identifying, by the counterphish elicitation system and based on the one or more attributes, a conversational pattern from the deep dialog, wherein the conversational pattern comprises a conversation depth of a given round of the two or more rounds of the deep dialog, and respective class labels corresponding to attributes that appear in the given round;
      dynamically producing, based on the identified conversational pattern, the playbook associated with the adversarial actor automatically, wherein the playbook is indicative of a dialog interaction strategy implemented by the adversarial actor; and
      providing the playbook to a social engineering attack (SEA) system in order to detect, avoid and/or mitigate future attacks.

21. A computing device for determining an adversarial attack playbook associated with an adversarial actor, comprising:
   one or more processors; and
   data storage, wherein the data storage has stored thereon computer-executable instructions that, when executed by the one or more processors, cause the computing device to perform operations comprising:
      receiving an electronic communication from the adversarial actor, wherein the electronic communication is intended for a target user;
      engaging in a deep dialog with the adversarial actor by deploying a synthetic persona dynamically during the electronic communication intended for the target user, wherein the deep dialog comprises two or more rounds of electronic communication exchanges between the adversarial actor and the synthetic persona;
      determining a length and type of the deep dialog in order to obtain one or more attributes related to the adversarial actor;
      identifying, based on the one or more attributes, a conversational pattern from the deep dialog, wherein the conversational pattern comprises a conversation depth of a given round of the two or more rounds of the deep dialog, and respective class labels corresponding to attributes that appear in the given round;
      dynamically producing, based on the identified conversational pattern, the playbook associated with the adversarial actor automatically, wherein the playbook is indicative of a dialog interaction strategy implemented by the adversarial actor; and providing the playbook to a social engineering attack (SEA) system in order to detect, avoid and/or mitigate future attacks.

\* \* \* \* \*